United States Patent [19]

Wakata et al.

[11] Patent Number: 5,243,614
[45] Date of Patent: Sep. 7, 1993

[54] WAVELENGTH STABILIZER FOR NARROW BANDWIDTH LASER

[75] Inventors: Hitoshi Wakata; Atsushi Sugitatsu; Hajime Nakatani; Yasushi Minamitani, all of Amagasaki, Japan

[73] Assignee: Mitsubishi Denki Kabushiki Kaisha, Tokyo, Japan

[21] Appl. No.: 795,793

[22] Filed: Nov. 21, 1991

[30] Foreign Application Priority Data

Nov. 28, 1990 [JP] Japan ................... 2-335419
Apr. 3, 1991 [JP] Japan ................... 3-70764
Sep. 6, 1991 [JP] Japan ................... 3-227194

[51] Int. Cl.[5] ............................................. H01S 3/13
[52] U.S. Cl. ..................................... 372/29; 372/28; 372/30; 372/32; 372/57
[58] Field of Search ............... 372/29, 30, 57, 28, 372/32

[56] References Cited

U.S. PATENT DOCUMENTS

| | | | |
|---|---|---|---|
| 4,947,398 | 8/1990 | Yasuda et al. | 372/29 |
| 4,977,563 | 12/1990 | Nakatani et al. | 372/32 |
| 5,087,884 | 12/1992 | Terada | 372/29 |
| 5,107,511 | 4/1992 | Nakatani et al. | 372/29 |
| 5,142,543 | 8/1992 | Wakabayasta et al. | 372/32 |

FOREIGN PATENT DOCUMENTS

| | | |
|---|---|---|
| 3832636 | 4/1989 | Fed. Rep. of Germany . |
| 3890298 | 5/1989 | Fed. Rep. of Germany . |
| 3891284 | 4/1990 | Fed. Rep. of Germany . |
| 64-22086 | 1/1989 | Japan . |

OTHER PUBLICATIONS

J. Opt. Soc. Am. B., vol. 5, No. 8, pp. 1576–1587, Aug. 1988, Ch. Salomon, et al., "Laser Stabilization at the Millihertz Level".
Wavelength Stabilization System for a Pulsed or CW Laser by T. Henderson and H. Rieger (Optics and Laser Technology, Aug. 1986, pp. 187–189).

Primary Examiner—Georgia Y. Epps
Attorney, Agent, or Firm—Oblon, Spivak, McClelland, Maier & Neustadt

[57] ABSTRACT

A wavelength monitor/stabilizer for narrowly controlling the bandwidth of laser; the monitor/stabilizer uses parameters Q, F or G derived by measuring diameters of interference fringes given by the beam of the wavelength-controlled narrow bandwidth laser e.g. excimer laser and those given by the reference light e.g. of a mercury lamp. The controlling is made by controlling the parameter to be in a predetermined range. An image sensing unit for detecting the interference fringes are splitted into plural image sensors with adjustable distance for enabling more rapid measurement by skipping the in-between part.

8 Claims, 30 Drawing Sheets

WAVELENGTH STABILIZER FOR NARROW BANDWIDTH LASER

FIELD OF THE INVENTION AND RELATED ART STATEMENT

1. Field of the Invention

The present invention generally relates to monitor and/or stabilization of a wavelength of a narrow bandwidth laser; and it is particularly concerned with a wavelength stabilizer for an excimer laser which emits a strong laser beam in the ultraviolet region and is required to have a high level of accuracy and stability in its wavelength when used mainly for a stepper, i.e., step-and-repeat machine.

2. Description of the Prior Art

FIG. 22 is a schematic view of an example of the conventional wavelength stabilizer for a narrow bandwidth laser, shown for instance, in the periodical OPTICS AND LASER TECHNOLOGY, August 1986, pp. 187. In this figure, numeral 1 designates a laser beam whose wavelength should be stabilized, numeral 2 denotes an Ar laser used as a reference light source for calibrating the wavelength of the laser, numeral 3 designates an etalon, numerals 4, 5 and 6 each designates a lens for projecting interference fringes, numeral 7 designates the projected interference fringes, numerals 8a and 8b each designates an optical detector, numerals 9a and 9b each denotes a differential amplifier, numerals 10a and 10b each designates an etalon controller, numerals 11a and 11b each designates a piezo electric element, and numeral 12 denotes an etalon for narrowing the bandwidth of the laser beam 1.

In the following paragraphs, the operation of the above-mentioned wavelength stabilizer for a narrow bandwidth laser will be described.

The beam 1 of the narrow bandwidth laser and the beam of the Ar laser 2 are incident to the etalon 3. As the beams are outgoing from the etalon 3, only those having particular angular constituents are selected. When these beams pass through the lens 5, they project the interference fringes 7 having diameters of $2f\theta$ at a focal plane of the lens 5 (f is the focal length of the lens; $\theta$ is the outgoing angle of the beam). Because any laser beam has only a particular angular constituent, the lens 4 is provided for focusing the beam of the laser radiation, so as to create various angular constituents from the parallel beam. This lens 4 may be replaced by a known diffuser. The lens 6 is a magnifying lens which is provided to enlarge the diameters of the projected interference fringes by elongating the equivalent focal length, which is assumed to be created by a combination of the lens 6 and the lens 5.

First, the system of the upper half of the figure will be considered. The interference fringes projected by the Ar laser 2 are detected by the optical detector 8a. The detector 8a has a light receiving face split into two elements and both of the split light receiving elements are electrically connected to the differential amplifier 9a, respectively. Then, if the position of the interference fringes is biased to either side of with respect to the light receiving face, an electric signal is generated at the output of the differential amplifier 9a. Based on the output signal, the etalon controller 10a adjust the voltage to be applied to the piezo electric element 11a, thereby to change the gap distance between both the discs constituting the etalon, until the bias in the position of the interference fringes with respect to the light receiving face disappears. As a result, the gap is kept always constant.

On the other hand, in the system of the lower half loop of the figure, the angle of inclination with respect to the optical axis of laser beam traveling through the etalon 12 in a laser resonator is changed based on the interference fringes attributable to the laser beam, in order to select the wavelength of the narrow band laser. This operation is automatically repeated until the laser beam is adjusted to impinge upon the two segment optical detector 8b without the biasing.

Thus, the adjustment to a desired value of the wavelength of the narrow bandwidth laser can be made, by (1) observing the wavelength in a separate spectrometer, (2) moving the optical detector (8b) to a position where the value of desired wavelength is attained and (3) thereby making the interference fringes projected upon the optical detector (8b) without any biasing.

The conventional wavelength stabilizers for a narrow bandwidth object laser have been configured as described in above, and have utilized the Ar laser having a brightness of a high level and a wavelength of sharp peak as its wavelength reference. They however need to accurately control the gap distance in the etalon for the monitoring and to maintain the position of the light receiving elements to be stable. In addition to these requirements, in case of using an excimer laser as the narrow bandwidth laser, which has a wavelength differing considerably from that of Ar laser, it is required to accurately keep the change in the refractive indices attributable to the differences in the wavelength under due control, and also for changes in the environment such as temperature, pressure and the like. Thus, they are sometimes disadvantageous in that they are unable to control the wavelength of the object excimer laser to a wavelength of the desired value, even when the position of the interference fringes is brought to the predetermined position. Then, the wavelength of the excimer laser after the adjustment may sometimes differ from the desired wavelength, depending upon the change in the environment.

Therefore, in order to shift the desired wavelength of the excimer laser, the use of the separate highly precise spectrometer is required. And furthermore, in order to reduce the influence attributable to the environmental change, the etalon for monitoring must be housed in a thermostatic container.

Further, in the wavelength controlling apparatus disclosed in the specification of Tokkai-Sho (Japanese Unexamined Patent Publication) 64-22,086, the interference fringes created by the reference light source are brought to coincide with the interference fringes created by the excimer laser, or both fringes are controlled so as to have predetermined clearances. Even in the disclosed apparatus, however, the environment surrounding the etalon is required to be maintained to be stable. This is because, even if the position of the interference fringes is kept stable (the same size and position), the wavelength may differ when the etalon for monitoring is subjected to change.

In the following paragraphs, the prior art relating to the other wavelength monitoring mechanism will specifically be described.

FIG. 23 is a schematic view showing an example of the conventional wavelength monitoring mechanism for a narrow bandwidth laser disclosed in the Abstract for CLEO Proceedings (CLEO '89, THU 4). In FIG.

23, numeral 101 designates a beam of the narrow bandwidth pulse laser, numeral 102 denotes an etalon for monitoring the wavelength, numeral 103 designates a lens, numeral 104 denotes an image sensor, numeral 105 inclusively designates a wavelength monitor, numeral 106 denotes a control unit and numeral 107 designates an etalon for narrowing the bandwidth of the laser.

The operation of thus-configured conventional wavelength monitoring mechanism will be explained. In order to reduce the fluctuation in the wavelength of the narrow bandwidth pulse laser, a part of the beam 101 is introduced into the wavelength monitor 105. The wavelength monitor 105 comprises the etalon 102 as its spectrometric element and serves to select the constituents having the particular incident angles. The beam having passed through the etalon 102 is collimated by the lens 103 and creates interference fringes composed of concentric circles on the focal plane of the lens 103. When the wavelength of the laser fluctuates, diameters of the concentric circles composing the interference fringes are changed accordingly. Thus the wavelength of the laser can be controlled by monitoring the diameter change and adjust that the measured diameter should be a given particular value.

In most cases, one dimensional image sensor 104 is used for measuring the diameter. Such an image sensor is composed of from several hundreds to several thousands of optical detectors such as photo-diodes aligned along a straight line, and can convert a spatially distributed light intensity profile into an electric signal of light intensity distribution, by sequentially reading out each of the light intensity signals detected by each of the photo-diodes.

FIG. 24 is an example of a graphic representation of the light intensity distribution profile derived from the interference fringes detected by an image sensor having 1,024 channels and observed by an oscilloscope. The size or pitch of arrangement of each of the photodiodes or sensor element is 25 micron, and the total length of the image sensor is 25.6 mm. Since a group of pulse signals is generated for each of the sensor elements, each unit of the signal reading system for each of the sensor elements, usually composed of an optical sensor element such as photo-diode, is called as the channel. By sequentially reading out one channel every 4 $\mu$sec., the image sensor of the length of 25.6 mm can output the light intensity distribution signal derived from the interference fringes projected on the image sensor taking the time period of 4.096 m sec. FIG. 24 is the light intensity distribution profile obtained by processing as mentioned above, wherein the spatial position on the image sensor is represented on the abscissa, i.e., time axis of the oscilloscope.

FIG. 25 is waveform diagrams showing a temporal relationship between the laser pulse, the signal generated by the narrow bandwidth pulse laser and the light intensity signal read by the image sensor. In this figure, the upper waveform represents a timing of the laser pulse, the middle waveform represents a timing of a trigger signal indicating the start of reading operation by the image sensor, and the lower waveform includes the light intensity distribution profiles derived from the interference fringes appearing at the oscilloscope.

The reading operation by the image sensor starts with the trigger signal and is finished after the time lapse of 4.096 m sec. Thereafter, the interference fringes are formed on the image sensor 104. The light intensity distribution profile derived from the interference fringes starts to be read when the subsequent trigger signal arrives. In the case shown in FIG. 25, the light intensity signal derived from the interference fringes can be read for every trigger signal. In this figure, a first trigger signal is a reset pulse, which forces the electric charge, which had been accumulated in the image sensor by being exposed to the stray light, thereby to output during a pause of the laser pulse. The actual measurement is started with the subsequent trigger pulse. Further, time spans indicated in this figure as exposure time periods A and B correspond to the exposure time periods at channels A and B, respectively, on both ends of the image sensor 104 shown in FIG. 23. The channel A outputs the signal immediately after the input of the reset pulse, and continues to be exposed until the next trigger pulse is arrived. The channel B outputs the signal after the lapse of 4.096 m sec from the input of the reset pulse, and continues to be exposed 4.097 m sec after the arrival of the subsequent trigger pulse. In this figure, only one laser pulse is presented in each of both the exposure time periods A and B.

The thus-obtained interference fringes are arithmetically processed in a CPU in the control unit 106 and read to give diameters. Based on the results of such processing, the other etalon 107 provided in a laser resonator is controlled to stabilize the wavelength of the pulse laser.

Since the conventional wavelength-monitoring system is configured as mentioned above, when the repetition rate (frequency) of the pulse laser exceeds over 250 Hz, the period of the laser pulse will become under 4 m sec accordingly, which is shorter than the time period for the reading. As a result, the conventional wavelength-monitoring system would be disadvantageous in that it is unable to measure the fluctuation in the wavelength of the laser radiation for every pulse of the laser.

Namely, in a case wherein the laser and the image sensor operate in a timing shown in the waveform diagrams of FIG. 26, a disadvantage occurs in that since the repetition time of the laser oscillation during a given exposure time period for a given channel of the image sensor differs from that during the other exposure time period, and an erroneous light intensity distribution profile might be produced.

For example, a time span A indicated in FIG. 26 represents the exposure time period of the first channel, whereas a time span B represents the exposure time period of the 1,024th channel of the image sensor. In the shown case, the time span A includes only one laser pulse whereas the time span B includes two laser pulses. As a result, the former half of a signal derived from the interference fringes and indicating the light intensity distribution profile appears on a lower base line while the latter half thereof appears on a higher base line, or vice versa. Thus, discrete or step points F and F' appear between both halves on the light intensity signal. Therefore, the conventional wavelength monitoring mechanism might sometimes cause an error in determining the wavelength.

In the following paragraphs, the prior art relating to the other wavelength monitor will specifically be described. FIG. 27 is a schematic view of another example of the conventional monitoring optical system for stabilizing wavelength disclosed in, for instance, "Wavelength Stabilization and Control of Pulsed or CW Tunable Dye Lasers: A Simple Scheme", Appl. Opt. 26, 3659 (1987). In this figure, a numeral 201 designates a Fabry-Perot etalon of the air-gap type (hereinafter to be briefly referred to as FP) generally comprised of a pair of parallely arranged glass discs with multiple reflecting films, whose gap distance is kept constant by a plurality of spacers and is filled with an inert gas. Numeral 207 designates an incoming beam of a single mode frequency-stabilized HeNe laser (633 nm), and numeral 223 designates an incoming beam of a dye laser having a wavelength around 500 nm, whose wavelength is to be stabilized. Numeral 209 designates interference fringes projected on a focal plane which is at a focal length f of a lens 222. Numeral 210 denotes a linear image sensor, numeral 211 designates a diffuser, and numeral 222 denotes an achromatic Fourier Transfer convex lens (hereinafter, to be briefly referred to as a achromatic FT lens) of the focal length f, having an achromatic function for both the radiations of the wavelengths at 500 nm and 633 nm.

In the following paragraphs, the operation of the disclosed conventional wavelength monitor will be described. When the incoming beam 207 impinges upon the diffuser 211, each of the wavelength constituents included in the incoming beam 207 come to have a variety of angular constituents by the diffuser 211, and only a particular angular constituent of the respective wavelength constituents is made to travel through the FP 201. Each of the wavelength constituents radiated in the particular angular constituent is collected by the achromatic lens 222 and is caused to create interference fringes 209 at a position of the focal length f of the achromatic FT lens. In case of using this achromatic lens 222, however, its focal length for the incoming beam of the dye laser 223 of the wavelength around 500 nm and that of said HeNe laser 207 of the wavelength at 633 nm differ from each other. The difference is in the range of observation error, and the focal lengths can safely be regarded to be "f" in common for these two incoming beams. In accordance with the above-stated principle, the relative positions between both interference fringe images of the dye laser and of the HeNe laser are kept in a stable relationship. Namely, by maintaining the spatial relationship between the diameters of these two kinds of the interference fringes stable, the stabilization of the wavelength of the dye laser beam 223 is realized, on the basis of a standard derived from the wavelength of the HeNe laser accordingly.

At present, a beam of an excimer laser is required to have a line spectrum within the permissible range of several pm ($10^{-12}$m), when used in a microlithography for manufacturing a wafer of a large scale integrated circuit (LSI). For instance, a reference is made to Kanti Jain "Excimer Laser Lithograph" published by SPIE Optical Engineering Press, 1990. Since the spectral bandwidth of the free-running oscillation of the laser is originally in the range of 2-3 pm ($10^{-12}$m), a value being smaller by one digit is required for the stabilized center wavelength after this spectral bandwidth is subtracted. Therefore, an accuracy in the observation and a stability of the wavelength monitoring system are also required to be in the order of pm ($10^{-12}$m) or better.

In the example disclosed in the above-mentioned paper, the author's intended accuracy is only in the order of 10 pm, which is far lower than that of the present invention. Therefore, the accuracy specifications for the respective components in this prior art is not so severe and are completely different from and lower than those required in the present invention. However, even in the case of this prior art which intends establishing of an accuracy in the order of 10 pm, a temperature control of the components in $\pm 1°$ C. is necessary. Accordingly, it is easily deduced that a temperature control in the order of several 1/100 degree becomes necessary for ensuring the accuracy in the order of under $10^{-12}$, by taking account of the wavelength error attributable to the thermal distortion of the etalon.

Therefore, as described in this paper, it has been general to use a reference light source for the purpose of calibration and to compare the wavelength of the reference light beam directly with the wavelength of the narrow bandwidth laser beam through an etalon. However, when a calibration of the wavelength of a KrF laser is intended by using the HeNe laser as disclosed in this paper, the focal length f of the lens may differ for different wavelengths of both the beams with each other, because the achromatic performance of the FT lens is not sufficient (in this connection, it is said that a perfect achromatic lens cannot be obtained because preferable materials for the lens are hardly available in the ultraviolet region). Thus, the wavelength monitor of the prior art has been disadvantageous in that it is unable to cope with the measurement and/or control of the wavelength sufficiently, at an accuracy in the order of pm ($10^{-12}$m) or better, because either one or both of the projected images become out of focus, thus failing to project correct interference fringes 209.

Though there has been a proposal of using a low pressure mercury lamp having a wavelength of 254 nm or a hollow cathode lamp with iron vapor having a wavelength of 248 nm in a wavelength-stabilization apparatus for stabilizing the wavelength of 248 nm of the narrow bandwidth KrF excimer laser, such proposed way has had a problem that: such proposed way is still insufficient for the above-stated measurement and/or control at an accuracy in the order of sub-pm ($10^{-13}$ m or further severe), because such reference light sources themselves have a spectral bandwidth of about several $10^{-12}$ m.

OBJECTS AND SUMMARY OF THE INVENTION

The present invention is made to solve the above-stated disadvantages inherent to the conventional apparatus, and has, as its object, a provision of a wavelength stabilizer which is for a narrow bandwidth laser and which is capable of maintaining the actual wavelength to the desired wavelength to be always stable in spite of environmental changes.

Another aspect of the present invention is made to overcome the disadvantages inherent to the conventional wavelength monitoring mechanism for a narrow bandwidth laser and has, as its object, a provision of a wavelength monitoring mechanism which has a high level of accuracy in the reading of the wavelength for a pulse laser of high repetition rate (frequency).

A still other aspect of the present invention is made to overcome the disadvantages and to obviate the insufficiency inherent to the conventional wavelength monitor and has, as its object, a provision of a wavelength stabilizer for a narrow bandwidth laser, having a center wavelength stability in the order of pm ($10^{-12}$ m) or better.

According to the present invention, there is provided in the wavelength stabilizer for a narrow bandwidth laser, wherein an oscillating wavelength of an excimer laser is measured by utilizing interference fringes given by passing the beam of said excimer laser through an etalon and said oscillating wavelength of said narrow bandwidth laser is controlled based on the results of said measurement, the wavelength stabilizer includes a reference light source for calibrating said oscillating wavelength, a means for measuring the diameters of the interference fringes given by the beam of said reference light source for calibration, and a means for measuring the diameters of said interference fringes given by said laser beam of said excimer laser, and the wavelength stabilizer is characterized by comprising:

an arithmetic unit for processing parameters derived from the measurements of said diameters and parameters derived from the desired wavelength of the laser and a control unit for controlling said oscillating wavelength of said excimer laser in a manner that these parameters coincide.

In the above-stated wavelength stabilizer for a narrow bandwidth laser, said reference light source may preferably have a wavelength in such a range as to satisfy the number of significant digits of the refractive index corresponding to the desired accuracy of the wavelength of the narrow bandwidth laser.

In the above-mentioned wavelength stabilizer for a narrow bandwidth laser, said etalon may preferably be sealed in a container which is accommodated in a thermostatic container with a filter for absorbing the visible light.

In the wavelength stabilizer for a narrow bandwidth laser in accordance with the present invention, the diameters of the interference fringes created by the reference light source for calibration and the diameters of the interference fringes created by the excimer laser are measured. Then, parameters derived from the result of the measurements of the above-mentioned both sets of diameters and parameters derived from the desired wavelength are arithmetically processed and compared. And then the oscillating wavelength of the excimer laser is controlled in a manner that these parameters coincide with each other.

Therefore, the wavelength stabilizer for a narrow bandwidth laser in accordance with the present invention is advantageous in that even slight changes in the arrangement of the optical system for the wavelength stabilizing mechanism as well as changes in the environment do not adversely affect the determination of the wavelength of the excimer laser.

Further, a light source having a wavelength which approximates to the wavelength of the excimer laser is employed as the reference light source for calibration, for establishing a high level of accuracy in the measurement. Therefore, even if the environment (temperature and pressure) surrounding the etalon used for monitoring the wavelength is changed, an error in determining the wavelength attributable to the change in the refractive index is limited to be small. As a result, the wavelength of the excimer laser can be maintained to the desired wavelength with acceptable accuracy.

According to the afore-mentioned another aspect of the present invention, in the wavelength monitor for a narrow bandwidth laser, the image sensing unit is split into plural image sensors, and is provided with a device for adjusting the distance therebetween. In the above-mentioned wavelength monitor for a narrow bandwidth laser, its image sensing unit is split into plural image sensors and the distance between the image sensor is made adjustable. Therefore, the wavelength monitor is advantageous in that it can read only those parts of the interference fringes that is just necessary for measuring the diameters of the interference fringes and therefore can shorten the time period required for the readings. This is made by providing each of the image sensors at a position which is the most convenient for observing the required interference fringes. Further, the wavelength monitor has another advantage of its capability in reading the wavelength, even when the repetitive rate (frequency) of the laser becomes to a high level.

According to a modified version of the afore-mentioned another aspect of the present invention, the wavelength monitor for narrow bandwidth laser, comprises: means for selecting a particular channel from the multiplicity of channels composed of optical detectors included in said image sensing unit and reading the detected light intensity signal carried on the selected channel.

In the above-stated wavelength monitor for narrow bandwidth laser, its image sensing unit is provided with a means for selecting a particular channel included in the image sensing unit and reading the information carried by the selected channel. Therefore, the wavelength monitor is also advantageous in that it can read only such parts of the interference fringes that which is just necessary for measuring their diameters and can shorten the time period required for the readings.

According to a still modified version of the aforementioned aspect of the present invention, in the wavelength monitor for a narrow bandwidth pulse laser, an interval for reading the image sensor is selected as long as an-integer-times the repetitive interval of the pulse laser oscillation.

In the above-mentioned wavelength monitor for narrow bandwidth laser, the interval between the reading commands for its image sensing unit is made as long as an-integer-times the interval between the oscillating pulses of the pulse laser. As a result of the above-mentioned configuration that the number of the laser pulses included in an exposure time period of the first channel of the image sensor is made always equal to the number of the pulses included in an exposure time period of the last channel of the image sensor. Therefore, the wavelength monitor is advantageous in that any discrete point in the light intensity distribution profile given by the readings can effectively be eliminated and the accuracy in the measurement can therefore be improved.

According to the afore-mentioned still other aspect of the present invention, in the wavelength monitor for stabilizing the center wavelength of the narrow bandwidth laser, a material having a coefficient of linear expansion of $5 \times 10^{-5}$ or smaller such as ZERODUR, (trade name of a glass ceramic material, available from SCHOTT, West Germany) is employed for spacers in the Fabry-Perot etalon (FP), which is sealed in a gas-tight container with a high sealing performance and with a means for keeping the etalon's temperature within ±5 degrees' fluctuation.

In the above-stated wavelength monitor, a separate reference light source may preferably be employed as a means for inspecting the stability in the adjusted wavelength. The reference light source may preferably be a highly stable, narrow spectrum light source such as a wavelength-stabilized HeNe laser. Further, in order to utilize the reference light source most effectively, the gap of the FP used for forming the interference fringes may be provided with films having a reflectance which is sufficiently high for both the wavelengths of the narrow bandwidth excimer laser and of the HeNe laser. The optical system for projecting the interference fringe images may preferably be comprised of achromatic lenses of high accuracy or reflecting optical components showing no chromatic aberration, and a means for driving the image sensor. The optical system and the FP may preferably be subjected to an initial adjustment in a manner that at least one of the peaks of the focused interference fringes and their entire image attributable to the beams of the excimer and of the HeNe may appear in a range capable of being observed by the optical system simultaneously.

In the above-stated wavelength stabilizer for a narrow bandwidth laser, the permissible range for the temperature variance is widened by using an FP of air-gap type and by using a material with a low linear coefficient of expansion as the material for the spacers in the FP. In addition thereto, the variances in the refractive index of the FP are eliminated by sealing the FP in a gas-tight container. As the results of these measures, the wavelength stabilizer built in accordance with this aspect of the present invention is made advantageous in that the results of the measurements by the monitoring FP are made independent on the conditions of the environment; and the use of the FP as the wavelength criterion can be made possible.

In addition to this, by configuring the wavelength stabilizer with a reference light source having a stable and sharp line spectrum, an FP having reflection films with a reflectance sufficient for both the beams of two wavelengths, and an appropriate optical system, and also by performing an appropriate initial adjustment, it has now been made possible to measure the center wavelength of a narrow bandwidth laser at an accuracy in the order of pm ($10^{-12}$ m) or better which had hitherto been impossible to attain.

In a modified version of the above-mentioned aspect of the present invention, a single mode wavelength-stabilized HeNe laser having an effective spectral bandwidth with a wavelength stability in the order of 0.004 pm is used as the reference light source. Further, an optical system arranged in a manner that both the interference fringes attributable to the HeNe laser and the narrow bandwidth laser can be equally projected on a region of the image sensor with an appropriate magnification.

While the novel features of the present invention are set fourth particularly in the appended claims, the invention, both as to its organization and content, will be better understood and appreciated, along with other objects and features thereof, from the following detailed description taken in conjunction with the drawings.

DESCRIPTION OF THE PREFERRED EMBODIMENTS

In the following paragraphs, preferred embodiments of the present invention will be described with reference to the attached drawings.

EXAMPLE 1

Figure 1:
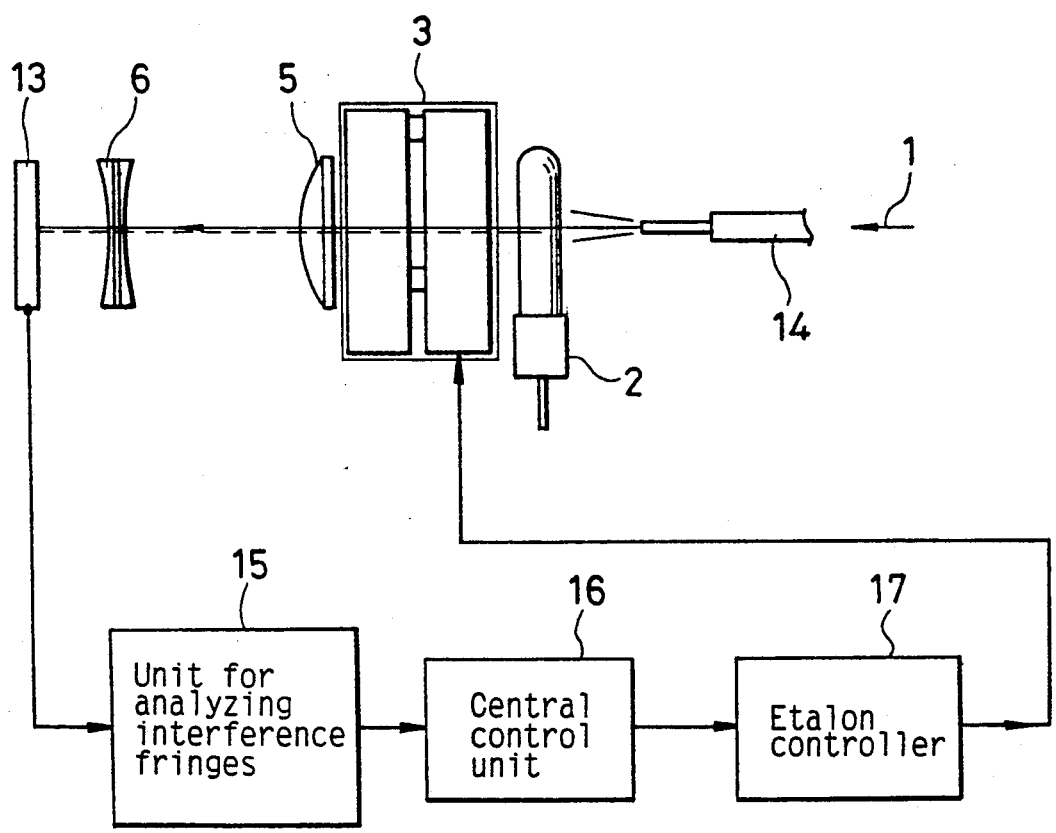
FIG. 1 is a schematic view showing a wavelength stabilizer for a narrow bandwidth laser built in accordance with an embodiment of the present invention.

FIG. 1 is a schematic view of a preferred embodiment of a wavelength stabilizer for a narrow bandwidth laser. As shown in FIG. 1, an object laser beam 1 whose wavelength should be stabilized is given through an optical fiber 14 and a transparent part of a low pressure mercury lamp 2 to an etalon 3. The mercury lamp 2 is used as a reference light source for calibrating the wavelength of the laser. The etalon 3 is composed of a pair of glass discs each having a reflection film thereon, being arranged in substantial parallelism keeping a very small gap therebetween by means of plural (usually three pieces) spacers provided at the circumferences of the discs. The effective thicknesses of the spacers may be finely adjusted by, for instance, piezo electric elements or threaded rods coupled with pulse motors. Alternatively, the gap may be kept constant and a density of the gas sealed in the gap may be varied for finely adjusting the characteristics of the etalon. The light output from the etalon 3 passes through a collector lens 5 and a magnifying lens 6, thereby projecting interference fringes and forming the interference fringe on an image sensor 13. Electric output of the image sensor 13 is given to and analyzed by a unit 15 for analyzing interference fringes. Numeral 16 denotes a central control unit, and numeral 17 denotes an etalon controller, i.e., a unit which generates a signal for driving the apparatus provided for finely adjusting the etalon 3.

In the following paragraphs, the operation of the above-stated wavelength stabilizer will be described.

Figure 2:
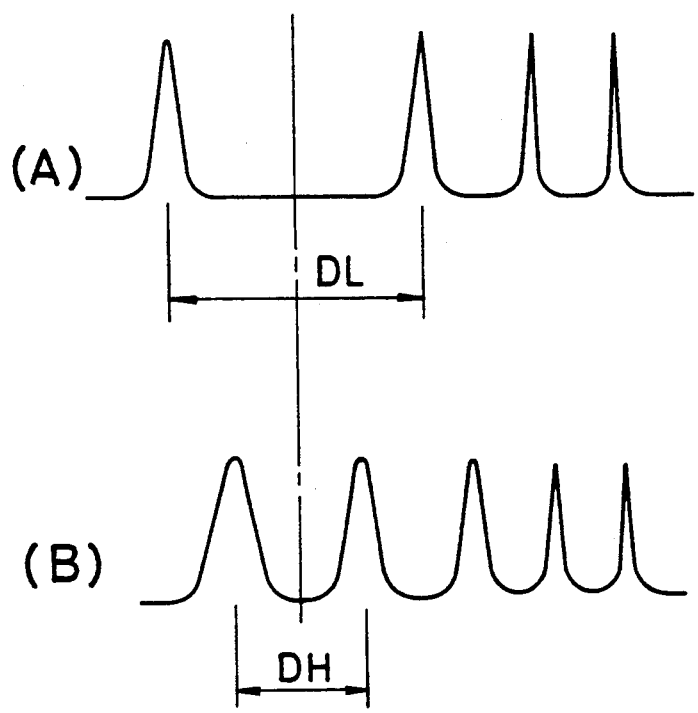
FIGS. 2(A) and 2(b), each is a graph showing a light intensity curve derived from the interference fringes obtained with reference to the embodiment of the present invention.

When the beam 1 of the excimer laser guided by the optical fiber 14 and the light of the low pressure mercury lamp 2 pass through the etalon 3, they become rays having a particular incident angle. The rays are collected by the lenses 5 and magnified by the lens 6, and then are projected on the image sensor 13 to create the interference fringes. FIG. 2 is graphs showing light intensity distribution profiles derived from the interference fringes, appearing as output signals at the image sensor 13, wherein (A) represent the interference fringes attributable to the excimer laser beam and (B) represents the interference fringes attributable to the mercury lamp. These interference fringes are obtained by lighting and extinguishing either one of the excimer laser or the mercury lamp.

In FIG. 2, $D_L$ and $D_H$, represent the diameters of the interference fringes attributable to the excimer laser and the mercury lamp, respectively. According to any text book of optics (for instance, Born & Wolf: Principle of Optics), the following formula is to be established on a diameter D of an interference fringe:

$$D^2 = 4\lambda f^2(p - 1 + e)/n \times d \quad (1)$$

wherein, $\lambda$ represents a wavelength, $n \times d$ represents an optical distance of the gap of the etalon, p indicates that the formula can be established on the p-th interference fringe from the center of the optical axis, and e is a numeral called a fractional order. The value e is proposed and introduced here for the first time by the present inventors, for controlling the wavelength.

If the image sensor 13 is arranged in such a manner that it can measure the diameters of plural interference fringes, the unit for analyzing the interference fringes 15 can determine the value of the fractional order e by arithmetically processing the results of the measurement as follows:

$$e = [\{D(P=2)/D(P=1)\}^2 - 1]^{-1} \quad (2).$$

On the other hand, $e_L$ (the value e for the excimer laser) for the desired wavelength $\lambda$ of the excimer laser can be calculated based on the following formula:

$$e_L = (m_H + e_H)\frac{n_L}{n_H} \times \frac{\lambda_H}{\lambda} - m_L \quad (3)$$

wherein, m represents the order number of the interference fringe for the particular wavelength, and n represents refractive index whose suffix H and L discriminate the index whether it is for the mercury lamp for the excimer laser. Further, $e_H$ represents a value obtained from the formula (2) by processing the result of the measurement of the interference fringes created by the mercury lamp.

In other words, when a commercially-available image sensor 13 is used as means for measuring the interference fringes and for making the measurement of plural interference fringes possible, controlling of the actual wavelength of the narrow bandwidth laser to a desired narrow bandwidth value can be made possible without using a separate spectrometer. This controlling can be made by comparing the value $e_L$ calculated based on the formula (3) with the value $e_L$ derived from the formula (2) based on a direct measurement at the interference fringe analyzing unit 15, and then varying the wavelength in a manner that the above-mentioned respective values of $e_L$ become equal with each other, even if the desired wavelength value changes slightly (within a range wherein the order number does not change).

Figure 3:
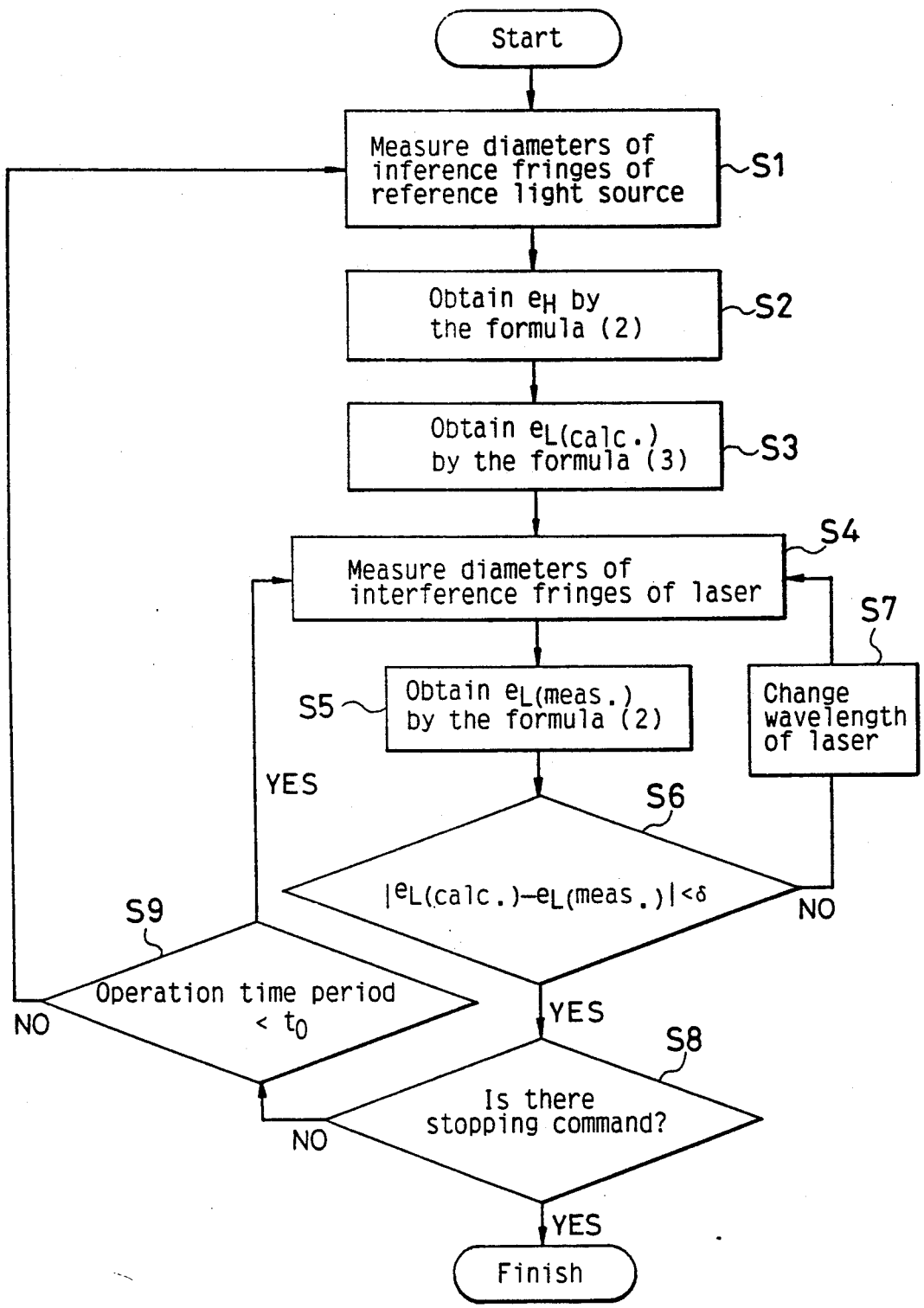
FIG. 3 is a flow chart showing the operation and procedure of the wavelength stabilizer for a narrow bandwidth laser built in accordance with the embodiment shown in FIG. 1.

FIG. 3 is a flow chart for illustrating the operating procedure of the wavelength stabilizer for a narrow bandwidth laser of the above-mentioned embodiment built in accordance with the present invention. In this flow chart, Step S1 is to measure the diameters of the interference fringes attributable to the light from the reference light source (mercury lamp) 2 for calibration and Step S2 is to calculate the value $e_H$ of the reference light source for calibration based on the formula (2). In Step S3, the value $e_L$ is calculated from the formula (3) by using the value $e_H$.

Next, in Step S4, the interference fringes attributable to the laser are measured, and the value $e_L$ is calculated by using the formula (2) in Step S5. At Step 6, a difference is obtained by subtracting $e_L$ in the above Step S3 (to be referred to as "$e_{L(calc.)}$— calculated value of $e_L$") from $e_L$ in the above Step 5 (to be referred to as "$e_{L(meas.)}$—measured value of $e_L$"), and the difference is scrutinized whether it is sufficiently small or not. If the result of the scrutiny is negative (i.e. the difference is large), the wavelength of the laser is changed at Step S7, and the process is returned to Step 4, wherein the diameters of the interference fringes are measured again. If the result of the scrutiny is affirmative, the presence of stopping command is examined at Step 8; on the other hand if the result is negative, the operation time period is scrutinized whether it is smaller than $t_0$ (a value obtained from the time constant of the environmental change during the laser oscillation) or not. Namely, if a sufficient time period for causing the environmental change lapses, the diameters of the interference fringes attributable to the reference light source for calibration are measured again, by returning in the loop from Step S9 to Step S1. However, if time period is smaller than $t_0$, the diameters of the interference fringes attributable to the laser are measured again by returning from Step S9 to Step S4.

The absolute value $\delta$ of the difference between $e_{L(calc.)}$ and $e_{L(meas.)}$ defines a permissible error. In order to use as the reference light source of the wavelength monitor, the center wavelength of the reference light should be stabilized to the value within $\pm 0.5$ pm. The permissible error is obtained by converting this range of the center wavelength into the fractional order e, and the intended control can then be performed in such a manner that the absolute value of the difference between the value $e_{L(calc.)}$ obtained from the desired wavelength by the formula (3) and the value $e_{L(meas.)}$ obtained from the actual measurement by rearranging by formula (2) by substituting the measurement values is smaller than $\delta$.

Figure 4:
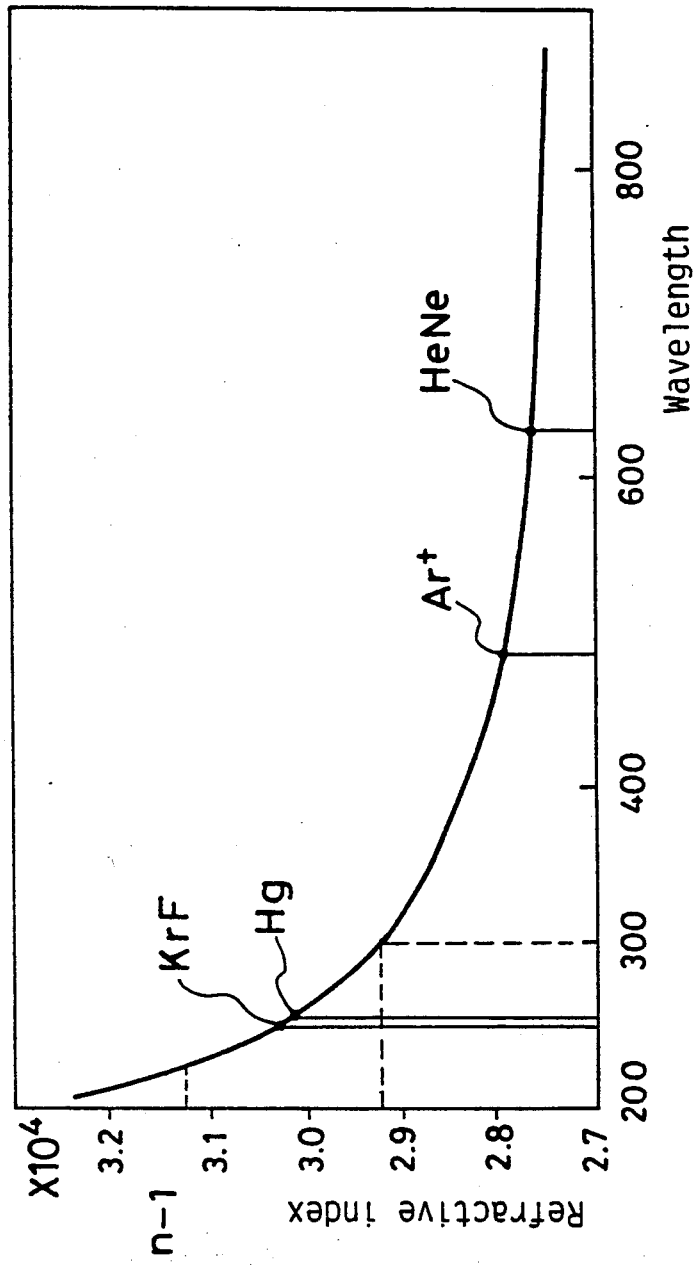
FIG. 4 is a graph showing the relationship between the wavelength of radiation and the refractive index.

Hereupon, let us consider the case disclosed with reference to the conventional example, wherein an Ar laser is used as the reference light source for calibration. As shown in a graph of FIG. 4, the refractive index of an optical system is varied depending on the wavelength of the radiation used in the measurement. Particularly, for a laser in the ultraviolet region such as an excimer laser, the refractive index n makes a considerable variance depending on the wavelength, and there is a difference of $2 \times 10^{-5}$ between the refractive index n of the Ar laser and that of the laser. Therefore, unless the variance in the refractive index attributable to the change in the wavelength is obtained with utmost accuracy, the accuracy of the wavelength derived from the results of the measurement is only in the order of five digits at best.

On the other hand, in the case of using a line spectrum light in the wavelength of 253 nm of the low pressure mercury lamp as the reference light source for controlling a KrF excimer laser (center wavelength: 248 nm), the difference in the refractive index is smaller by further one digit, and the accuracy in the measurement in the wavelength can be made six digits or better. Similarly, for a ArF excimer laser (center wavelength: 193 nm), another line spectrum light in the wavelength of 185 nm of the low pressure mercury lamp can satisfactorily be used for the purpose.

As stated-above, in order to ensure the accuracy of six digits, a light source having a beam wavelength that brings a refractive index which has the same fifth digit (for instance, around 300 nm for this case) can satisfactorily be used.

Although the above description is, limited to the low pressure mercury lamp; any other light sources, such as a hollow cathode lamp with iron vapor (center wavelength: 248 nm), may be usable for this purpose as long as they have a wavelength which approximates to that of the laser whose wavelength should be stabilized. Further, another narrow bandwidth laser may be calibrated as to its wavelength in a similar procedure, if a reference light source having a wavelength close to the wavelength of the laser whose wavelength should be stabilized is provided.

As state-above, in the case wherein the wavelength of the laser is close to the wavelength of the reference light source for calibration, an improvement in the accuracy of the measurement can be expected. Further, in such case, the following parameter Q may also be introduced in addition to the parameters defined by the formulas (2) and (3):

$$Q = (D_{L1}^2 - D_{H1}^2)/(D_{H2}^2 - D_{H1}^2) \qquad (4)$$

wherein, $D_{L1}$ represents a diameter of the first (designated by 1) interference fringe attributable to the laser (designated by L), and $D_{H1}$ and $D_{H2}$ represent diameters of the first and the second interference fringes attributable to the mercury lamp. This parameter Q is also proposed and introduced by the present inventors for the first time. Separate from the above-mentioned formula, the parameter Q may alternatively be expressed by the following formula:

$$Q = m_H + m_L \lambda/\lambda \qquad (5).$$

When the wavelength $\lambda$ of the laser equals the desired value, the particular value of Q obtained by the formula (5) is defined to be $Q_{o(calc.)}$. This procedure is performed at Step S0 in the flow chart shown in FIG. 3A.

Figure 3A:
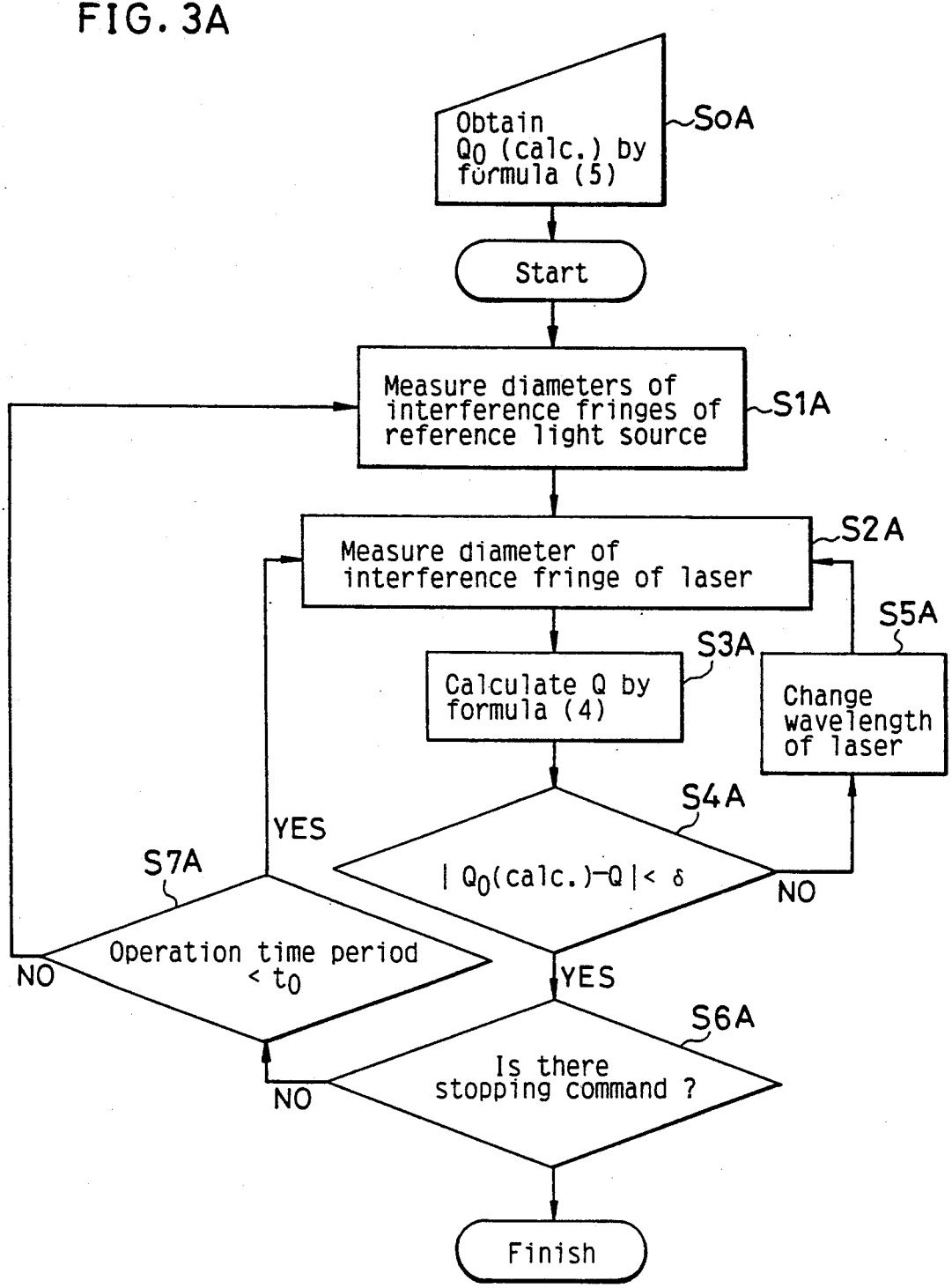
FIG. 3A, FIG. 3B and FIG. 3C each is a flow chart showing the operation and procedure using a parameter derived from the interference fringes, in the wavelength stabilizer for a narrow bandwidth laser built in accordance with the embodiment shown in FIG. 1.

Therefore, if the wavelength of the narrow bandwidth laser is changed in such a manner that the value of $Q_{(meas.)}$, which is obtained by the formula (4) and by the measurement results of the diameters of the interference fringes, is equal to the value of $Q_{o(calc.)}$, which is expected from the formula (5), in compliance with a procedure shown in a flow chart of FIG. 3A, the wavelength of the narrow bandwidth laser can be brought to the desired value. In this case, the measurement on only one of the interference fringes of the narrow bandwidth laser is found to be sufficient for the purpose, and thus the time period required for the measurement can be shortened.

In addition to this, in case where the desired wavelength is determined beforehand and a use of a spectrometer is permitted only in the initial stage, the wavelength can be maintained to the desired value, regardless of slight changes in the gap distance and in the refractive index. This can be made by selecting the respective values of the diameters $D'_L$ and $D'_H$ of the interference fringes at the time of calibrating the wavelength by the spectroscopy in a manner that these values can satisfy the conditions given by the following formula:

$$F = \frac{(D_L^2 - D'_L{}^2)}{(D_H^2 - D'_H{}^2)} = \frac{m_L \lambda}{m_H \lambda_H}, \qquad (6)$$

wherein F is again a new parameter proposed and introduced by the present inventors, and from the consideration of the left side of the formula (6) the right side is derived, and the right side is substantially a' constant.

Figure 3B:
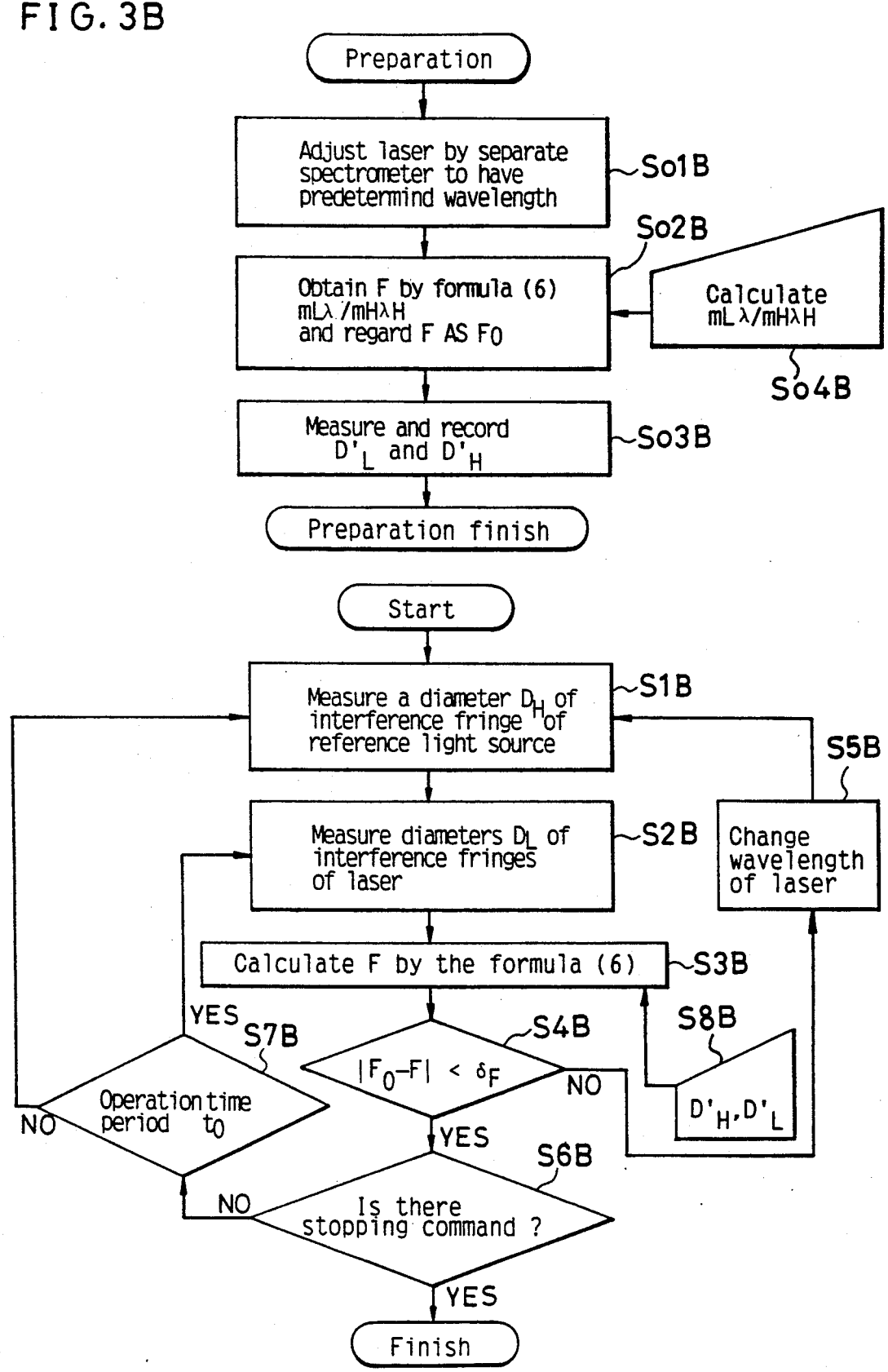

FIG. 3B is a flow chart showing an operative procedure wherein the parameter F is used. In the preparation steps of the flow chart, the wavelength of the laser is adjusted to the desired value by means of a separate spectrometer at Step So1B. In this procedure, the value F obtained from the right side of the formula (b), i.e., $m_L \lambda / m_H \lambda$, by substituting the wavelength value into the adjusted value is regarded as $F_o$ at Step So2B, and the permissible error to be used in this case is defined as δ. Next, the diameters of the interference fringes of the laser and the mercury lamp ($D'_L$ and $D'_H$) are measured and recorded, respectively at Step So3B. The above-mentioned preparation may be performed only once at the set up of the laser, and the usual operation starts from Step S1B. The procedure to be followed is similar to those already described, and the permissible error used in the control is defined as δ.

In another case wherein the wavelength of the reference light source is particularly close to that of the laser, i.e., $m_L\lambda/m_H\lambda \approx 1$, the formula (6) become simpler as follows:

$$G = D_H^2 - D'_H{}^2 = D_L^2 - D'_L{}^2 \qquad (7)$$

wherein, G is again a newly introduced parameter for this case.

Figure 3C:
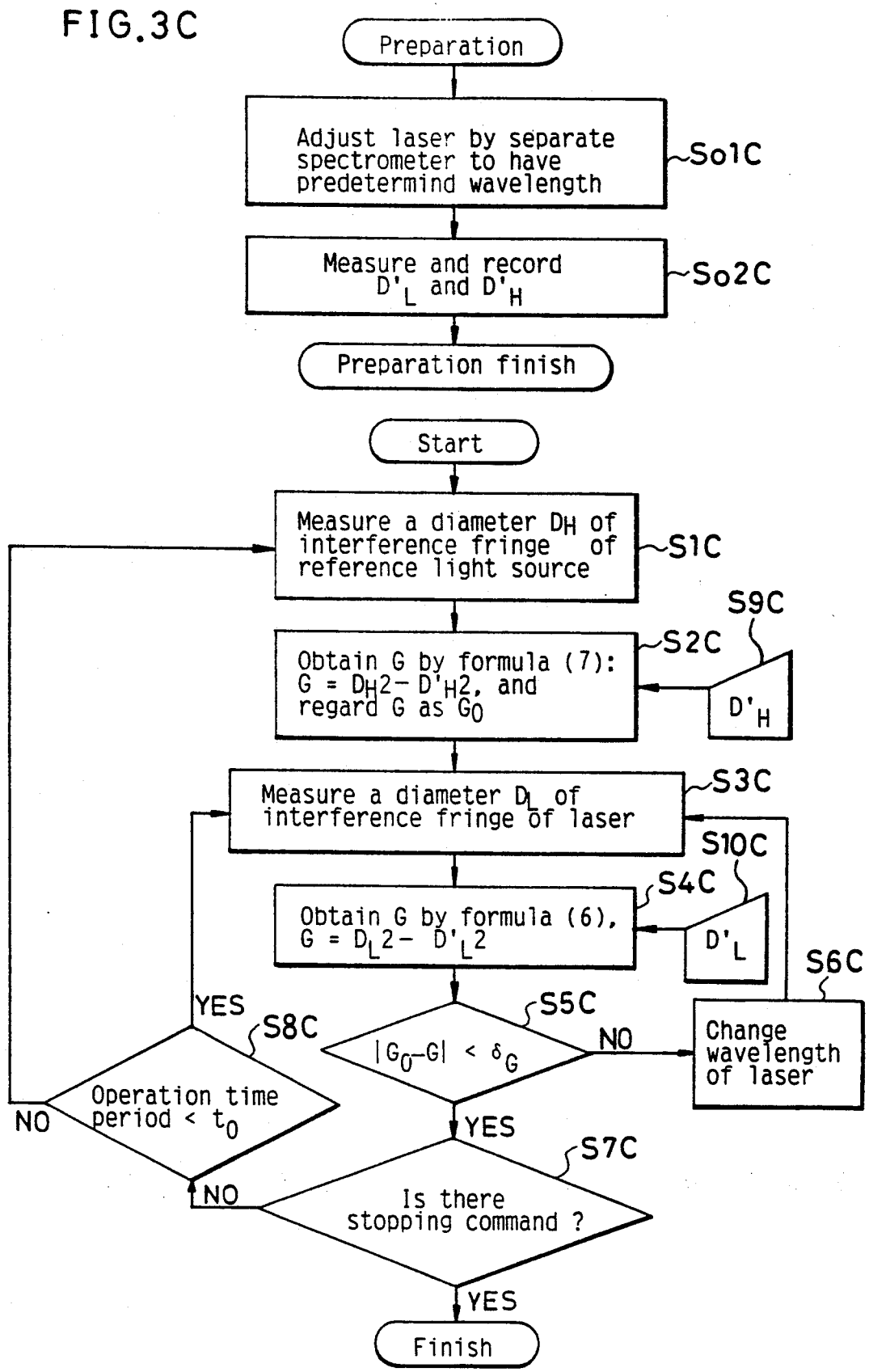

The operative procedure to be followed is shown in the flow chart of FIG. 3C, which is analogous to FIG. 3B. In this procedure, the value G obtained from the left side of the formula (7), i.e., $D_H^2 - D'_H{}^2$, is regarded as $G_o$ at Step So2C and the permissible error to be used in this case is defined as δ, which should be smaller than the difference between said $G_o$ and a value G obtained from the right side of the formula (7).

In this case, the term of $D_H^2$ can be eliminated from the left side, and only one of the interference fringe attributable to the mercury lamp may be sufficient for the purpose. Therefore, if the interference fringes are magnified by the lenses 5 and 6, and only each one of the interference fringe is selected to be projected on the measurement area of the image sensor, the time period required for the measurement is considerably shortened since scanning on only a limited number of sensor element is enough and the accuracy in the measurement is much improved since the interference fringe is magnified.

In the above-mentioned examples, pairs of two peaks in the light intensity curve created by the interference fringes centering around the center of the fringes are detected for calculating the diameters. However, in a case wherein the center position of the interference fringes has been known beforehand, a similar discussion can be made by detecting either ones of the peaks, by calculating the diameters of the interference fringes based on the result of the detection, and by deriving the similar parameters from the diameters.

Figure 5:
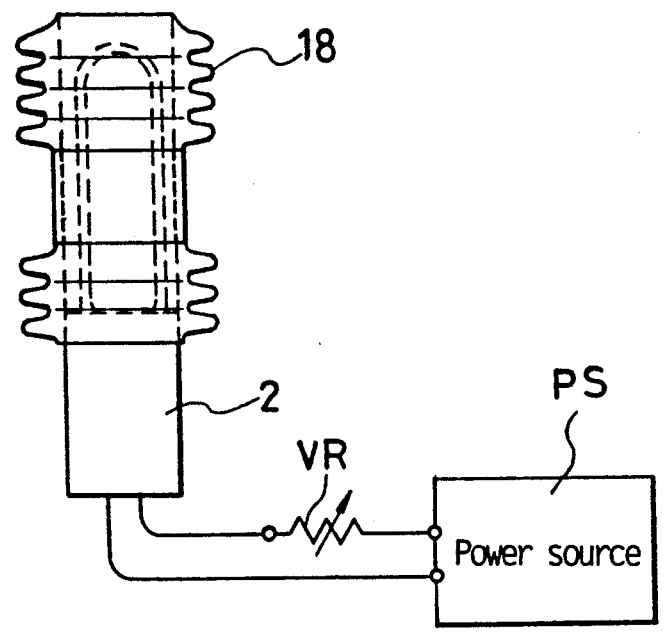
FIG. 5 is a schematic view showing a reference lamp for calibration used in the embodiment of the present invention shown in FIG. 1.
Figure 6:
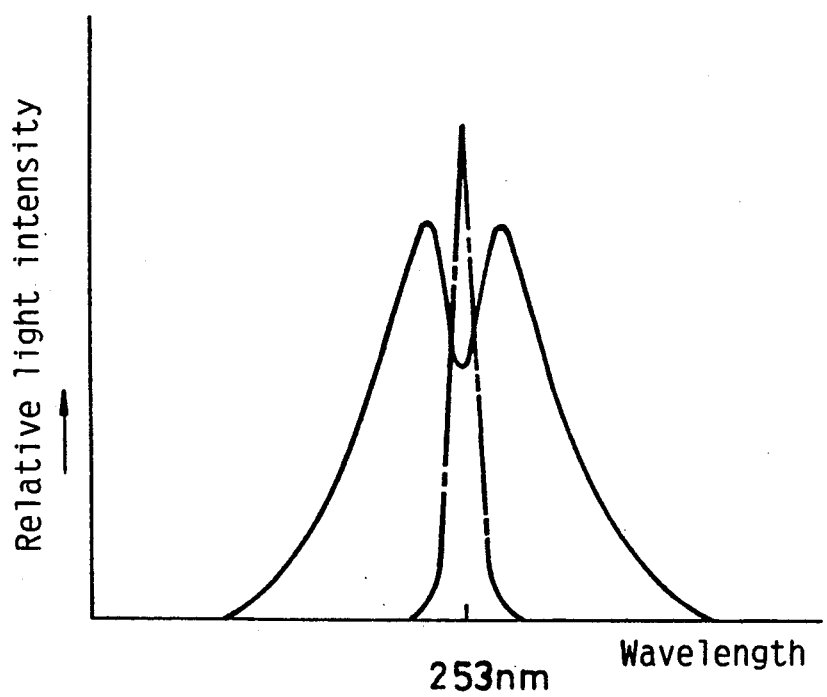
FIG. 6 is a graph showing a light intensity profile of a low pressure mercury lamp and showing a bandwidth of its wavelength.

FIG. 5 shows a mercury lamp 2 and its driving circuit. As shown in FIG. 6, each of the line spectra of the low pressure mercury lamp 2 has a wavelength width around 5 pm due to the presence of several isotopes of mercury. However, after lapse of time from turning the mercury lamp on, an extension of the wavelength width is observed because of the increase in the saturation vapor pressure of hydrogen, and at the same time a depression in the light intensity due to self-absorption is observed at the center of wavelength of the spectrum as shown in FIG. 6. As a result, the accuracy in the readings of the interference fringes attributable to the mercury lamp is adversely influenced. In order to prevent this disadvantage, a variable resistor VR is provided in the line connecting the mercury lamp 2 to the power source PS for controlling the electric power supplied to the mercury lamp 2. The electric power to be supplied is about 1 W/cm³. Alternatively, the increase in the saturation pressure of mercury in the lamp may be suppressed to a certain extent by providing fins 18 shown in FIG. 5 on the mercury lamp for air-cooling, or by directly water-cooling a part of the mercury lamp.

In addition to the above-mentioned measures, use of a mercury lamp, wherein undesirable effects of isotope is removed, further enables an achievement of a more narrow spectral line.

EXAMPLE 2

Figure 7:
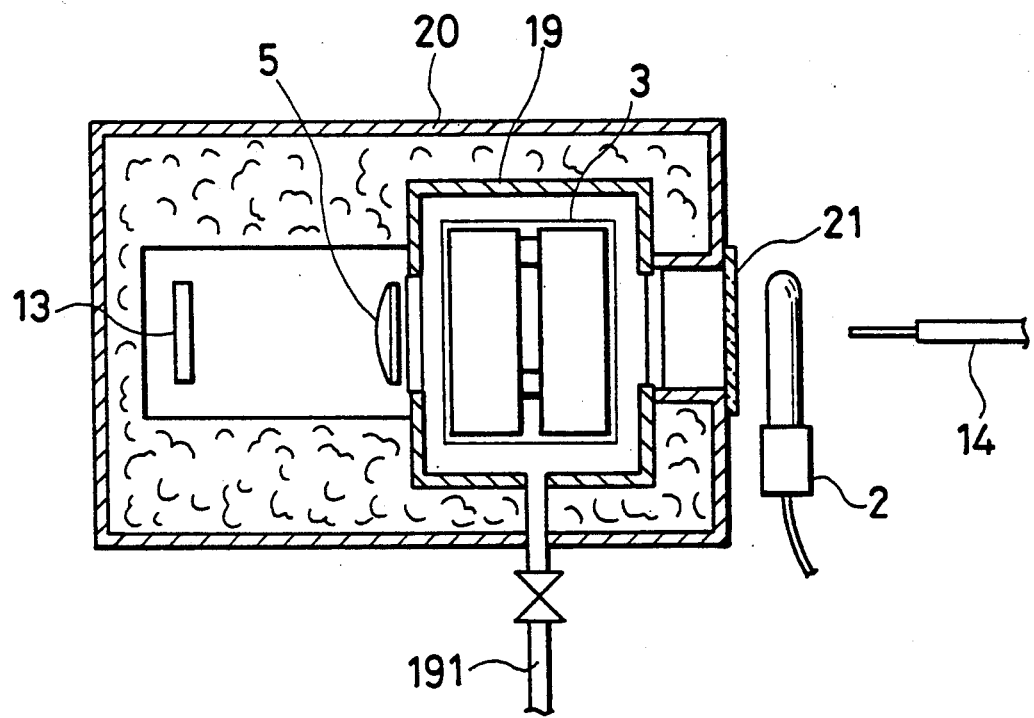
FIG. 7 is a schematic view showing a wavelength stabilizer for a narrow bandwidth laser built in accordance with another embodiment of the present invention.

FIG. 7 is a schematic cross-sectional view of a wavelength monitor of another embodiment of the wavelength stabilizer, wherein a container 19 for gas-tightly containing the monitoring etalon 3 is housed in a thermostatic container 20, and a filter 21 for absorbing unnecessary visible light and infrared light is preferably provided in the incident window of the container 19. A tube 191 is for supplying pressure-adjusted gas (e.g. $N_2$) in the container 19.

In actual operation, there is no need to be excessively anxious about the stability of the monitoring etalon, as long as the narrow bandwidth laser is always compared with the reference light source for calibration. In order to perform the wavelength control rapidly, it is however required to reduce number of repetition times of lighting the reference lamp for calibration.

Therefore, by accommodating the etalon in a container for gas-tight sealing and a thermostatic housing, the density of the environmental gas is preferably kept constant. In addition, by absorbing unnecessary visible lights and infra red rays from the light emitted from the mercury lamp 2 by the filter 21, the increase in the temperature of the etalon is prevented. As a result of these measures, the wavelength of the laser can be stabilized to be constant and the repetition times of lighting the reference lamp for calibration can be reduced, thereby enabling rapid wavelength controlling.

EXAMPLE 3

Figure 8:
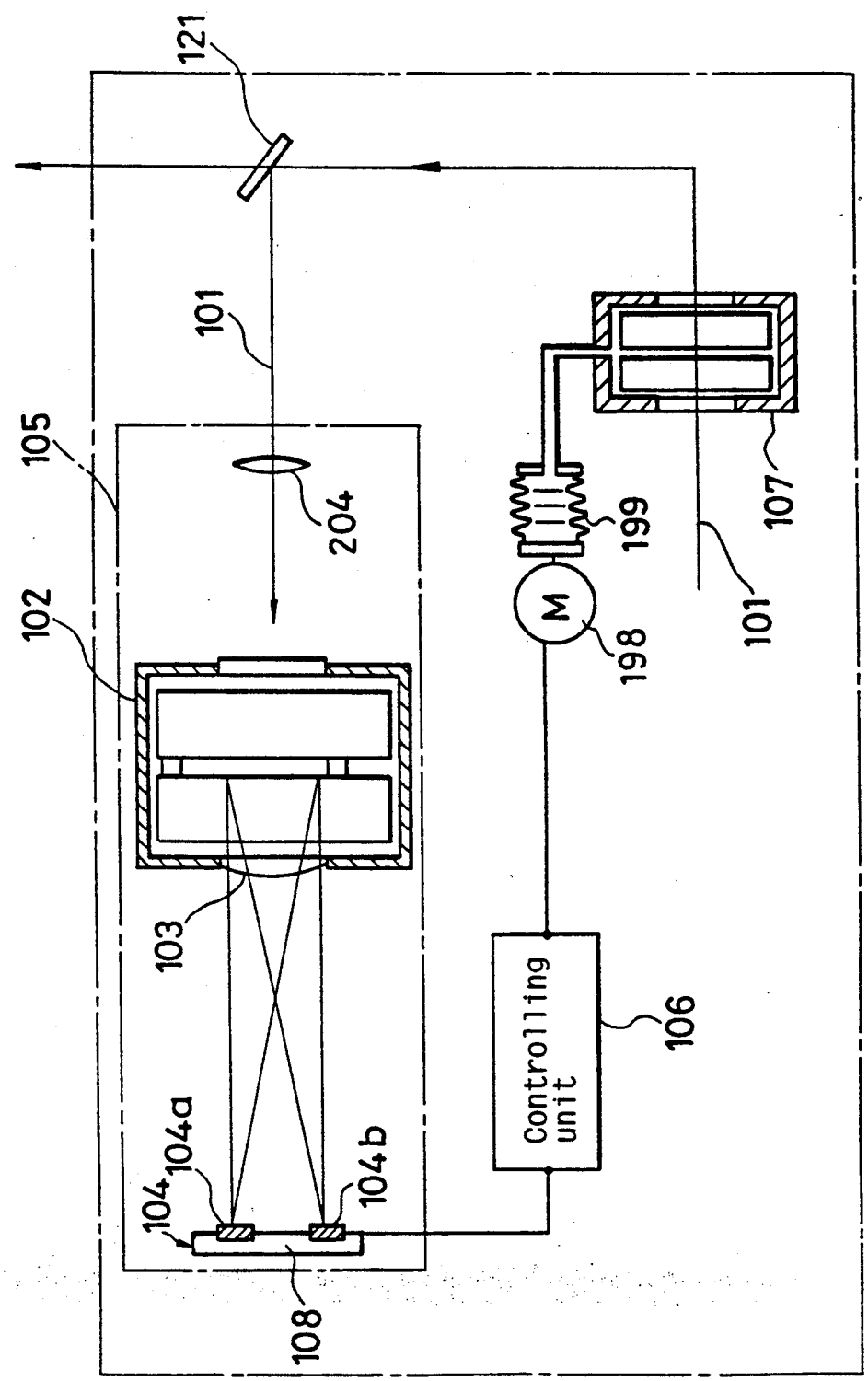
FIG. 8 is a schematic view showing a wavelength monitor for a narrow bandwidth laser built in accordance with an embodiment of the second aspect of the present invention.

This embodiment of the wavelength monitor for a narrow bandwidth laser is built in accordance with the second aspect of the present invention. In FIG. 8, a laser beam 101 of the narrow bandwidth pulse laser, whose bandwidth is to be controlled narrowly and accurately, is led through an etalon 107 for bandwidth narrowing through a half mirror 121 to a second etalon 102 for monitoring the wavelength. Light output from the second etalon 102 is focused by a lens 103 and projects an interference fringe on image sensors 104a and 104b, on an image sensing unit 108, which is provided with a distance adjuster device 104 for adjusting the distance between the split image sensors 104a and 104b. Numeral 105 inclusively designates a wavelength monitor. Electric output signal of the image sensing unit 108 is led to a control unit 106, whose electric output is given to a motor 198 for driving a pressure controller (bellows) 199 which adjusts the gas in the etalon 107.

In the following paragraphs, operation of the wavelength monitor shown in FIG. 8 will be disclosed.

In order to reduce the fluctuation in the wavelength of the narrow bandwidth pulse laser, a part of the beam 101 led through the first etalon 107 and the half mirror 121 is introduced into the wavelength monitor 105. The wavelength monitor 105 comprises the etalon 102 as its spectrometric element and serves to select the constituents having the particular incident angles. The light beam having passed through the etalon 102 is collimated by the lens 103 and creates interference fringes composed of concentric circles on the focal plane of the lens 103. When the wavelength of the object narrow bandwidth pulse laser fluctuates, diameters of the concentric circles composing the interference fringes are changed accordingly. Thus the wavelength of the object laser can be controlled by monitoring the diameter change and adjust that the measured diameter should be a given particular value.

In this embodiment, the pair of image sensors 104a and 104b are provided on the distance adjusting device 104 of the image sensing unit 108. On each of the two image sensors 104a and 104b, the interference fringe is projected, to output a detection signal to a control unit 106. The controlling unit 106 arithmetrically processes the results of the detection by the image sensors 104a and 104b inputted as light intensity signals on the basis of the distance thereto between the image sensors 104a and 104b which had been inputted beforehand. And the controlling unit 106 outputs a signal representing the diameters of the interference fringes. As has been clearly shown in this figure, the image sensing unit 108 can reduce the number of channels contained in both of the image sensors 104a and 104b, as compared with those of the conventional example. For example, if an image sensor having 64 channels is used and the light intensity signals are read simultaneously, the readings are completed for only 0.256 sec. Thus, if the laser is operated at the repetitive rate of 3 KHz or higher, even the fluctuation for every one shot can be detected.

Figure 9:
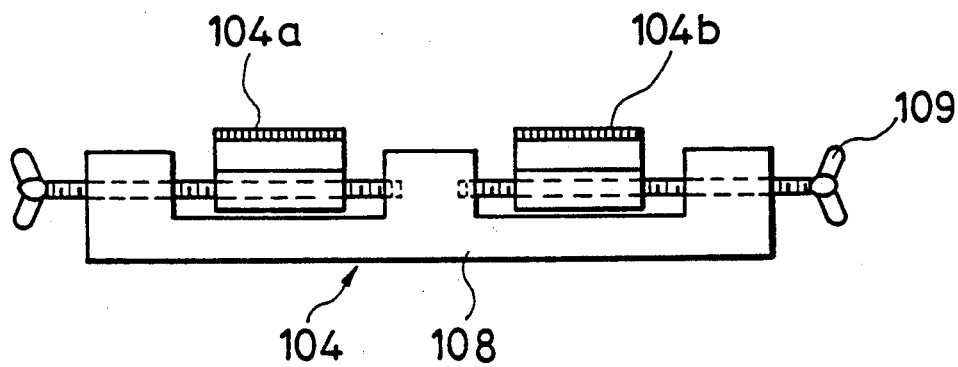
FIG. 9 is a schematic view showing an image sensing unit of the wavelength monitor of the embodiment shown in FIG. 8.

FIG. 9 is a schematic view showing the details of the image sensing unit 108, wherein a pair of the image sensors 104a and 104b are provided on the distance adjusting device 104 of the image sensing unit 108. A screw 109 for changing the positions of the image sensors 104a and 104b on the adjusting device is provided, and is able to be adjusted and to set the distance between the image sensors. The image sensing unit 108 can locate both the image sensors 104a and 104b at positions which are the most convenient for detecting the light intensity signals given by the interference fringes. If the image sensing unit 104 is designed to permit the reading of a feed of the screw 109 and the feed value is also inputted into the control unit 106, it is convenient for calculating the diameters.

EXAMPLE 4

Figure 10:
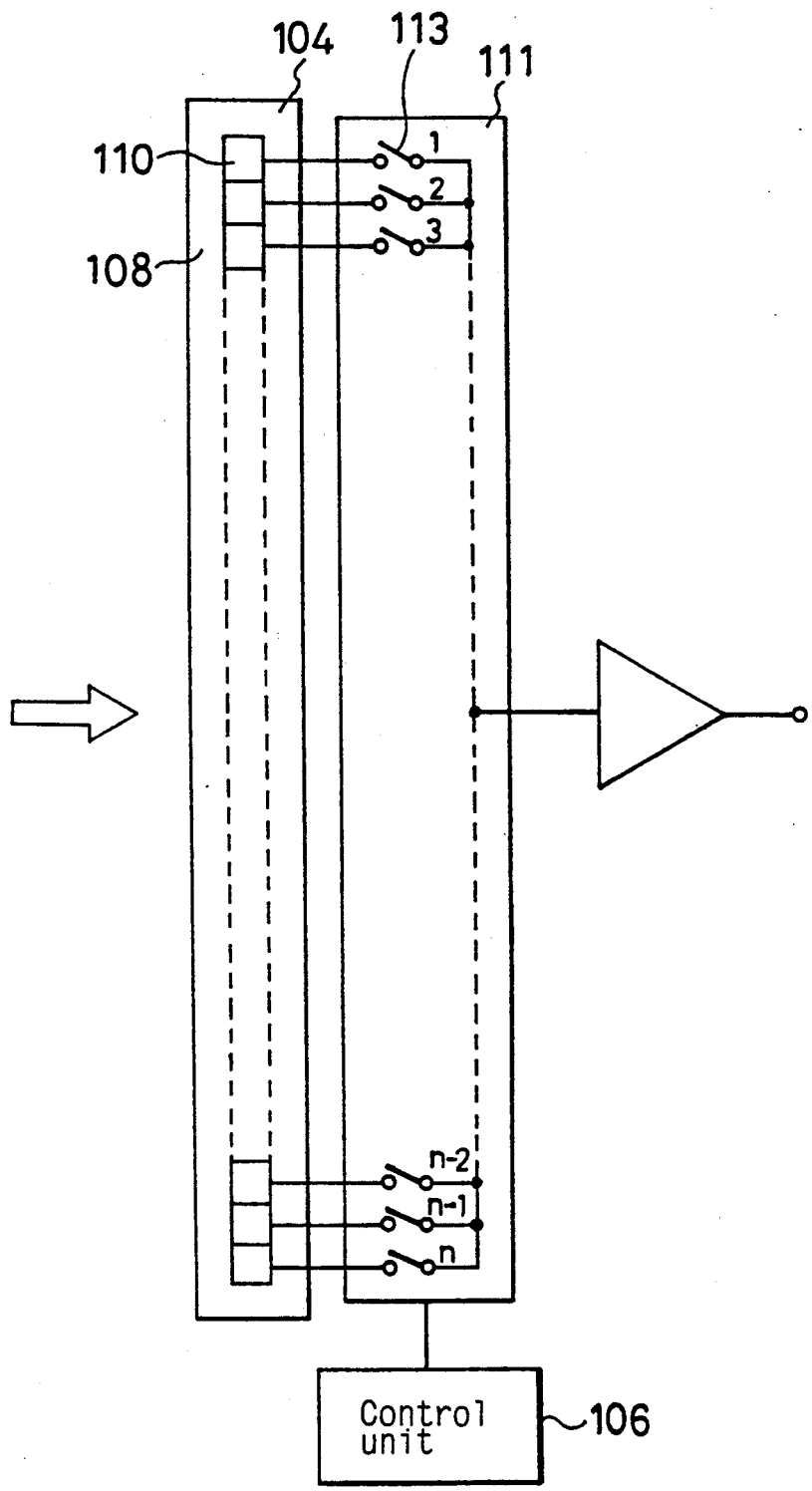
FIG. 10 is a schematic view showing an image sensing unit of the wavelength monitor of an embodiment built in accordance with the third aspect of the present invention.

FIG. 10 is a schematic view showing an image sensing unit 108 built in accordance with the third aspect of the present invention. In this figure, a number of optical detectors 110 are contained in the image sensing unit 108, which itself is similar to the image sensor in the conventional example. Respective outputs of the image sensors 110 are connected to a multiplexer 111. This image sensor is capable of being read of its light intensity signals stored in a particular one or a part of the channels contained in the image sensing unit 108 by being actuated by an external signal. The switches 113 in the multiplexer 111 are designed to be activated sequentially by the signal supplied by the control unit 106, and to permit the readings of the light intensity signals stored in the respective optical detectors 110 one by one. Such procedure is fundamentally customary for any semi-conductor memory device. In this case however, by reducing the numbers of the channels to be read in comparison with the foregoing embodiment, the time period required for the readings can be shortened accordingly.

In addition to this, this embodiment can dispense with a mechanical adjusting mechanism, such as screw 109 of the example of FIG. 9. But when a large change in the wavelength takes place, the same function for accommodating the monitor as the conventional one, can be accomplished by only changing the reading channels.

EXAMPLE 5

Figure 11:
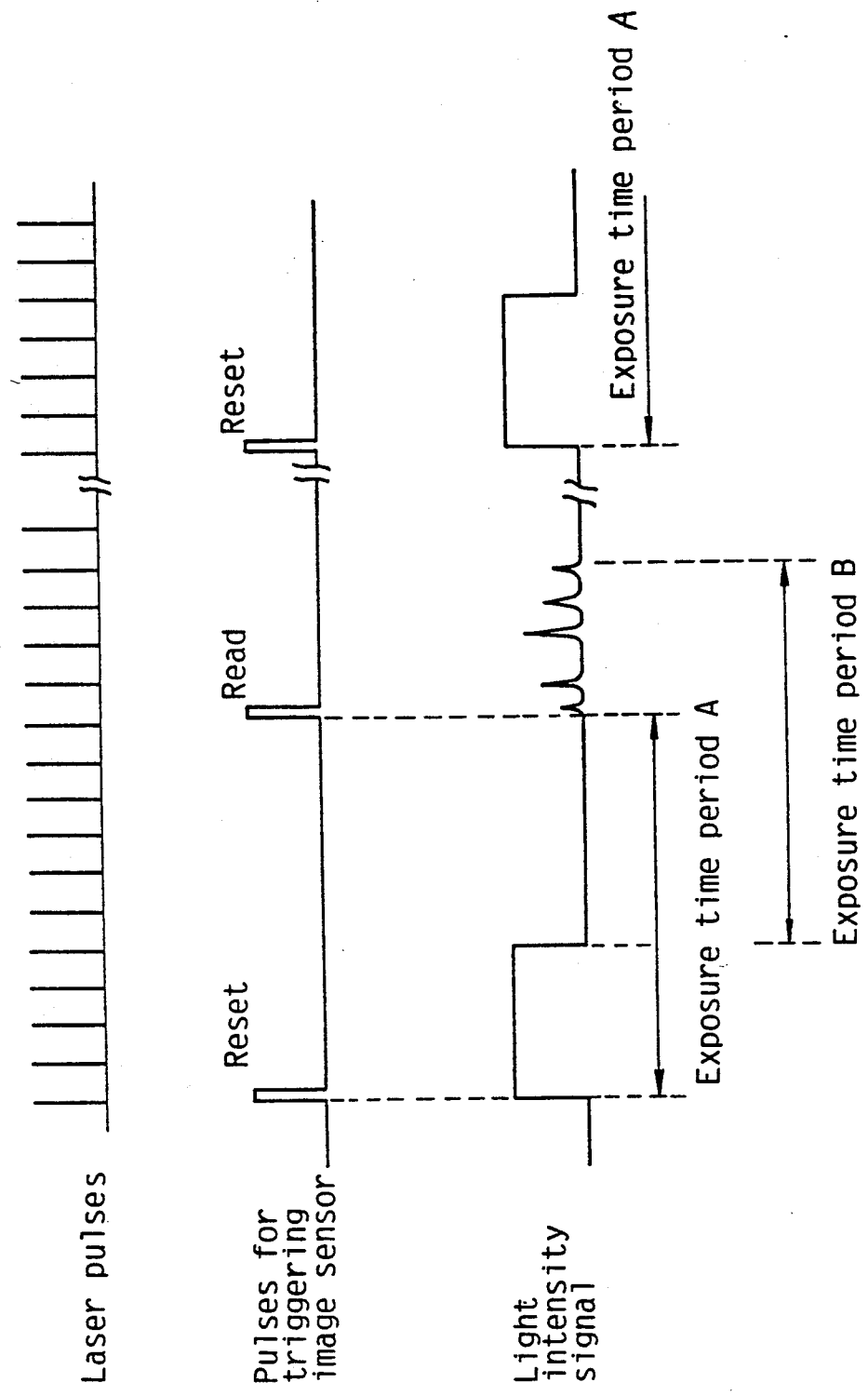
FIG. 11 is waveform diagrams indicating the temporal relationship among the laser pulses, trigger pulses and light intensity signal, which represents the operation performed in accordance with the fourth aspect of the present invention.

FIG. 11 depicts waveform diagrams showing an operation of the wavelength monitor built in accordance with the fourth aspect of the present invention. In this embodiment, the conventional or known image sensor is employed for the light intensity detection. In this case, although the fluctuation in the wavelength for every one shot of the laser pulse cannot be observed, the error in reading of the wavelength due to possible differences in the exposure time can be eliminated.

Provided that the etalon 107 contained in the resonator of the laser is stable and that it is hardly affected by vibration, the fluctuation in the wavelength for every one shot of the laser pulse can be ignored. In such a case, a phenomenon to be detected is only a wavelength drifting which may be caused by a thermal distortion and the like; and it is enough to observe a relatively slow variance. The undesirable discontinuous points hitherto included in the light intensity distribution profile can be eliminated by: equalizing (1) the numbers of the laser pulses included in the exposure time period A of the first channel of the image sensor with (2) the numbers of the laser pulses included in the exposure time period B of the final channel of the image sensor.

FIG. 11 shows the condition that the above-mentioned condition has been realized. That is, once the image sensor is reset before the start of the reading, thereby to force the charge accumulated in the optical detectors of the image sensor out, and the exposure time period is made as long as integer times of the period of the laser pulses. In case of continuing the readings successively with the same time intervals inbetween, the resetting may be performed only for the first instance, and the reading can safely be continued.

Figure 12:
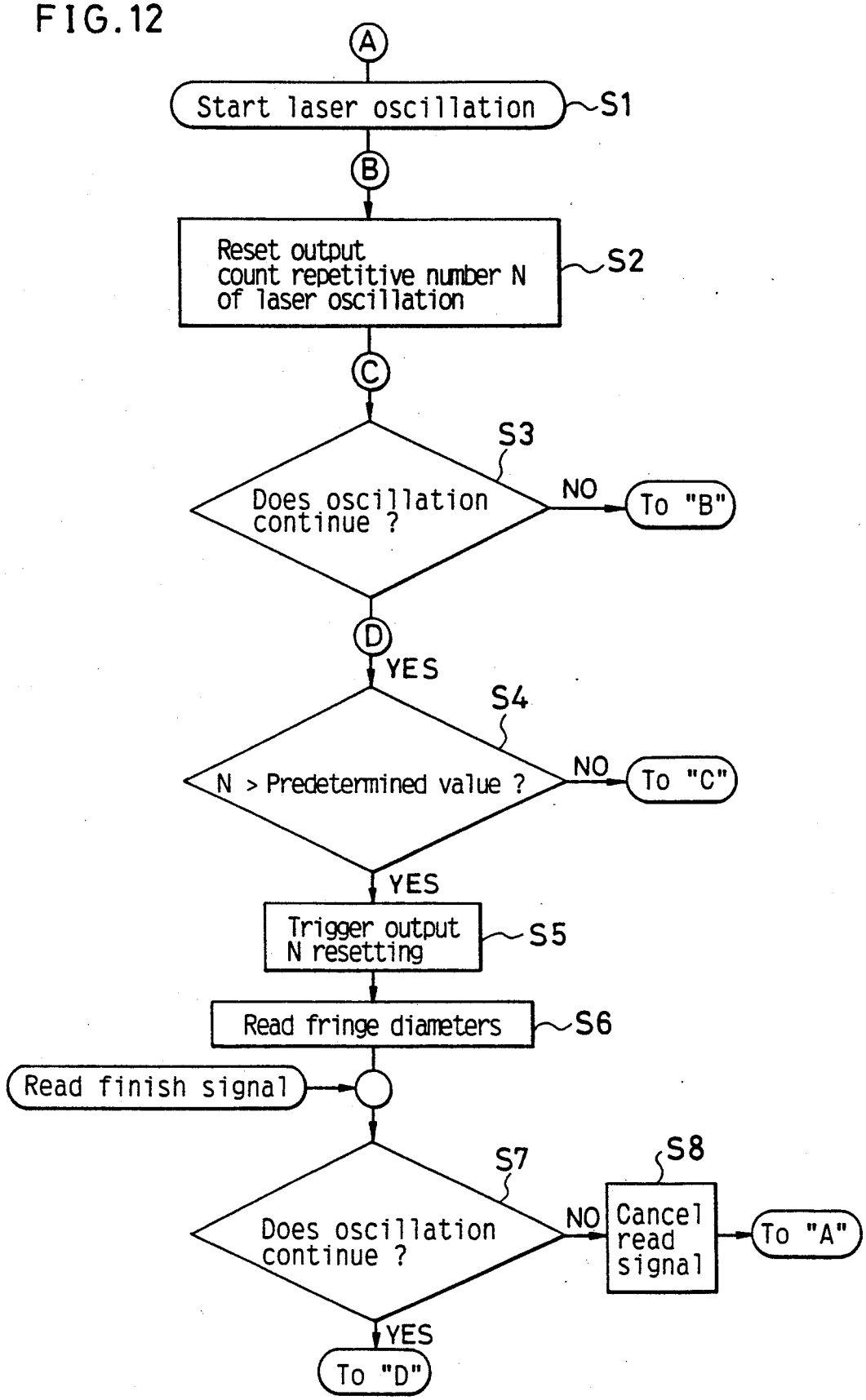
FIG. 12 is a flow chart showing the operation and procedure using a parameter derived from the interference fringes, in the wavelength stabilizer for a narrow bandwidth laser built in accordance with the embodiment shown in FIG. 8.

The procedure for the above-mentioned operation is described in a flow chart shown in FIG. 12. After the start of the laser oscillation (Step S1), the image sensor is reset and the count of the repetitive number N of the laser oscillation is started (Step S2). When the repetitive number N of the laser reaches the predetermined value (Steps S3 and S4), a trigger signal for actuating the image sensor to start its reading is generated; and, by resetting the already counted number N, a fresh count of the repetitive number N is started (Step S5). At Step 6, although the reading is started, the counting still continues because the discontinuous points might appear in the light intensity distribution profile by a sudden stop of the laser oscillation during the reading (Step S7); and when the oscillation is actually stopped, the read signal is cancelled (Step S8). If the oscillation continues, the process returns to the point D of the flow chart, and waits there until the count number N reaches the predetermined value again.

If the above-stated predetermined value (to be reached by the actual count number) is large, for instance about 100, wherein a few or several shots of laser oscillation do not affect the count number, there is naturally no need for the canceling. Further, in a case where the variance in the wavelength is slow and the exposure time period can be made long, it is needless to say that, there is no need to make the exposure time period as long as integer times the interval of the laser oscillation, and that the readings at every particular time point do not adversely affect the accuracy in the readings.

In the foregoing description, though only the case of a pulse laser has been discussed, a high speed reading of the wavelength in case of continuous oscillation can also be made possible, by employing the procedures discussed with reference to Examples 3 and 4. It is needless to say that, by employing the concept disclosed with reference to Example 5, the wavelength stabilization can be achieved also, if the repetition times of the reading are increased as compared with the time constant of the fluctuation of wavelength of the continuous output laser.

EXAMPLE 6

Figure 13:
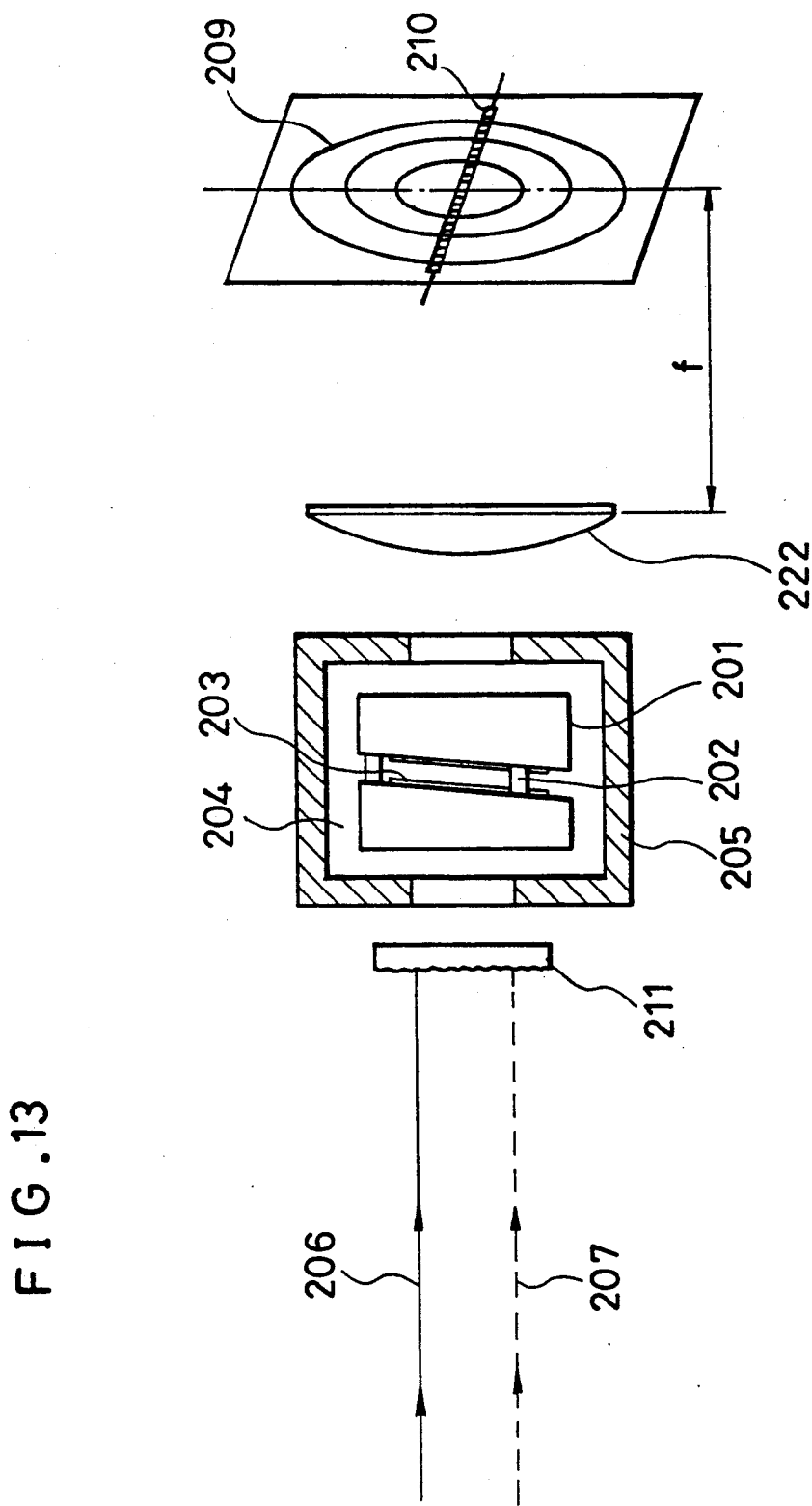
FIGS. 13 and 14, each is a schematic view showing an optical system in a wavelength monitor for a narrow bandwidth laser built in accordance with an embodiment of the fifth aspect of the present invention.

FIG. 13 is a schematic view showing a wavelength monitor for a narrow bandwidth laser built in accordance with a fifth aspect of the present invention. In FIG. 13, a Fabry-Perot etalon (hereafter: FP etalon) 201 of an airgap type contains spacers 202 made of a material whose linear coefficient of expansion is 1/10 or smaller of a synthetic quartz, e.g., about $0.05 \times 10^{-6}$. Bulk material for the discs in the FP etalon 201 is such a synthetic quartz that which has a high homogeneity and shows a high transmittance to ultra-violet rays. And the pair of the disc elements constituting the FP etalon are in an optical contact with the spacers 202. The optical contact is an adhesion attributable to hydrogen bonds, between two surfaces of components finished to high grade planes. The material with a low linear coefficient of expansion can be exemplified as ZERODUR (trade name) available from SCHOTT Co. Ltd., West Germany. It is a glass-ceramic material, i.e., a multi-crystal ceramic material including glass components, showing a very low linear coefficient of expansion by canceling the expansions held by the respective constituent materials with each other. ZERODUR is employed in this embodiment because its coefficient of thermal expansion does not show a hysteresis characteristic against the temperature variation at the time of the optical contact.

Reflection films 203 having a high reflectance (reflection coefficient) is provided on each opposing face of the bulks of the FP-etalon 201. The space inside a gas-tight container 205 is filled with an inert gas. In this embodiment $N_2$ is employed as the inert gas. An incoming beam 206 of an excimer laser of the wavelength 248 nm to be stabilized and an incoming beam 207 of a single mode frequency-stabilized HeNe laser employed as the reference light source are incident through a diffuser 211, which causes the respective laser beams to have their angular constituents. A Fourier Transfer lens (FT lens) 222 having a focal length f, is disposed on the output end of the FP etalon 201, so that interference fringes are projected on a focal plane at the focal length f from the FT lens. A linear image sensor for detecting the interference fringes is provided on the focal plane.

In the following paragraphs, the operation of the above-configured wavelength monitor will be described. In FIG. 13, the incoming beam 206 of the narrow Bandwidth excimer laser is caused to have various angular constituents by the diffuser 211, and enters the FP etalon 201. After being screened to have constituents of a particular angle by the FP etalon 201, the screened constituents pass through the FT lens 222 to give circular interference fringes 209 on a focal plane of the FT lens 222. The positions of the interference fringes are detected by the image sensor 210, and the wavelength of the narrow bandwidth laser is controlled based on the results of the detection in a manner that the positions of the interference fringes are brought to the specified positions.

If the environmental conditions of the FP etalon do not change, it is sufficient to control the wavelength of the narrow bandwidth laser in a manner that the positions of the interference fringes do always appear at the same positions. Actually, however, the environmental conditions are incessantly changing, and hence the following error $\Delta\lambda$ is produced between the desired target wavelength and the actual wavelength of the laser, even when the latter is controlled in a manner that the interference fringes always appear at the same positions:

$$\Delta\lambda/\lambda = (\Delta n/n) + (\Delta d/d) \qquad (8),$$

wherein, $\lambda$ represents the wavelength, n represents a refractive index at the wavelength of the gas filled in the gap of the FP etalon, and d represents a gap distance of the FP etalon; and it is provided for brevity that there is no angular changes in the optical system including the FP.

In general, the refractive index is directly proportional to the density of the substance filled in the gap between both reflecting planes. In a case where the FP etalon is sealed in a gas-tight container, the density of the gas does not change and thus $\Delta n = 0$. On the other hand, the change $\Delta d$ in the gap distance d becomes $\Delta d = \alpha d \Delta T$ when the linear coefficient of expansion of the substance contained in the gap is $\alpha$ and a temperature change in the environment is $\Delta T$. Hence, the wavelength error $\Delta\lambda$ attributable to the temperature change is thus given by the following formula:

$$\Delta\lambda = \alpha\lambda\Delta T \qquad (9).$$

Provided that $\Delta\alpha$ of 0.5 pm is permissible, the permissible range of temperature change for the narrow bandwidth KrF laser ($\lambda = 248$ nm) will be 4 degrees, when the synthetic quartz ($\alpha = 5 \times 10^{-7}$) is employed, while the range can be as large as 40 degrees when ZERODUR ($\alpha = 5 \times 10^{-8}$) is used as the material for the spacers. Although both are in the range capable of controlling, it is apparent that, in case where the permissible range of the wavelength error happen to be narrow, the employment of the material of a further small linear coefficient of expansion as the material for the spacers in the EP etalon is preferable in the practical points of view.

The above-mentioned formulae (8) and (9) can hold and the value of $\Delta\lambda$ can be calculated on such a hypothetical condition that the container is completely sealed, and thus, the density of the substance between both the reflecting surfaces is constant. Actually however, the density might sometimes be changed slightly by being influenced by a possible leak as well as a possible degasification from the wall of the container. Here, a wavelength error attributable to this influence will be estimated. Provided that the gas in the container is an ideal gas, the following formula will be established:

$$\Delta n/n = (n-1)(\Delta P/P - \Delta T/T) \qquad (10)$$

wherein, P represents a pressure of the gas, and n represents a refractive index of the gas in the gap at the pressure P.

The value $(n-1)$ is directly proportional to the pressure P. And when the gas is nitrogen, the value will be $3 \times 10^{-4} \times P(\text{atm})$. Provided that the temperature change is suppressed to a negligible small one, the wavelength error will be given by the formula:

$$\Delta\lambda = 3 \times 10^{-4} \lambda \Delta P \tag{11}$$

If the wavelength error of 0.5 pm can be permitted as in the already described case, the permissible pressure change will be $6.5 \times 10^{-3}$ atm.

As is clearly elucidated by the above-stated formulae and calculations, if a FP etalon having spacers which are made of a low linear coefficient of expansion and are sealed in a gas-tight container, and that environment temperature in the container is kept to a range in a certain extent, the FP etalon can function as a criterion, even when a wavelength accuracy of very high level such as 2 pm is required. The temperature range can be realized in such an environment as an adequately air-controlled clean room. Even in a room of more unfavorable conditions, similar accuracy can easily be realized, if the wavelength monitor is adequately controlled, such as being kept in a constant temperature by containing it in a thermostatic housing, by covering it with a heat insulating material, or by detecting its temperature and controlling the same by utilizing the detected temperature.

EXAMPLE 7

In case where a dislocation of some components, such as the FT lens or the image sensor in the optical system of the wavelength monitor is apprehended, it is effective for the wavelength stabilization to utilize a reference light source. As the reference light source, a HeNe laser beam 207 shown in FIG. 13 is employed in a case of a refraction optical system. An alternative case of a reflection optical system will be elucidated below with reference to FIG. 14.

The HeNe laser beam 207 having an effective wavelength bandwidth of about 0.004 pm was used as reference wavelength means. This bandwidth was adopted by taking the stability into consideration. The HeNe laser beam 207 is led to a diffuser 211 similarly to the excimer laser beam 206 to make a variety of angular constituents by the diffuser 211. Then the diffused lights are led in the FP etalon 201, and subsequently reflected on a surface of a non-spherical reflecting mirror 208 having a focal length f, to give interference fringes 209 at a focal plane of the mirror. The interference fringes 209 are detected by a linear image sensor 210. In order to obtain a sufficient wavelength stability of an excimer laser of ±0.2–0.3 pm or better, the actually observed wavelength bandwidth of the reference light beam 207 should be limited to 0.1 pm or smaller. Although the inherent spectral bandwidth of the HeNe laser beam 207 employed as the reference light source is as small as 0.004 pm, the observed spectral bandwidth actually projected as interference fringes 209 will be 0.1 pm or larger. This is because the instrumental function determined by the specification of the FP etalon 201 used for the observation is large.

On the other hand, as disclosed in the description relating to the embodiment of the first aspect of the present invention, in order to realize a wavelength stabilization with a high degree of reliability, the image sensor 210 should be able to measure at least one of the diameters of the interference fringes attributable to the narrowly bandwidth-controlled KrF laser 206 and to the reference HeNe laser 207. Even with all the endeavor to narrow the bandwidth corresponding to one channel of image sensor by magnifying the interference fringe images by the lens, there is a limitation imposed thereon.

Therefore, when the wavelength monitor is considered, both the limitations imposed by the instrumental function and by the magnifying ratio should be taken into account.

By taking the above matters into consideration, an image sensor 210 of a length: 25.6 mm (optical detectors of 25 μm width × 1,024 elements) is employed in this embodiment, and the wavelength of the interference fringes for one optical detector is adjusted to about 0.1 pm, by adequately combining the gap distance of the FP 201 with the focal length of the reflecting mirror 208. If the above-stated measure is combined with the spectral bandwidth of 0.1 pm of the interference fringes attributable to the HeNe laser, the image sensor will become capable of measuring the change in the wavelength of the narrowly bandwidth-controlled laser beam 206 at an accuracy in the order of pm or smaller (namely to the order of sub-pm).

Incidentally, in a case of calibrating the wavelength of a subject beam by employing a reference light source, a Free Spectrum Range (hereinafter, to be referred briefly to as FSR) of the FP etalon for monitoring the wavelength is subjected to a limitation. This is because that, the range of variance in the wavelength of the narrowed bandwidth laser 206 having the wavelength of 248 nm due to various factors is to be measured by the image of interference fringes, and provided that the range of variance is ±α pm the FSR of the FP etalon 201 is required to be at least 2α pm for the beam with the wavelength 248 nm. The reason for this is that if a variation exceeding the FSR occurs, it will be difficult to discriminate whether the above variation is attributable to α or α−FSR.

On the other hand, if the FSR is set as mentioned above, an FSR for a long wavelength reference light source (for instance, the HeNe laser having a wavelength of 633 nm in this case) is calculated to be $(633/248)^2 \times 2\alpha$ pm $\approx 13\alpha$ pm. This is illustrated by the graph shown in FIG. 15. As previously described with reference to FIG. 13 or FIG. 14, it is necessary to project at least one of the respective diameters of the interference fringes attributable to the narrowed bandwidth laser 206 and to the HeNe laser 207. Accordingly, there is some limitation on enlarging of the FSR by the conditions employed in measuring the interference fringes attributable to the HeNe laser. Further, as is clearly shown in FIG. 15, in a case of employing a reference light source having a wavelength longer than the narrowed bandwidth laser, as will be described later, it is necessary to employ such a reference light source that has a wavelength width equivalent to or narrower than that of the narrowed bandwidth laser and an FP that has films of a high reflecting coefficient, for decreasing thickness of the fringes projected on the image sensor, and also for obtaining a higher finess.

Figure 15:
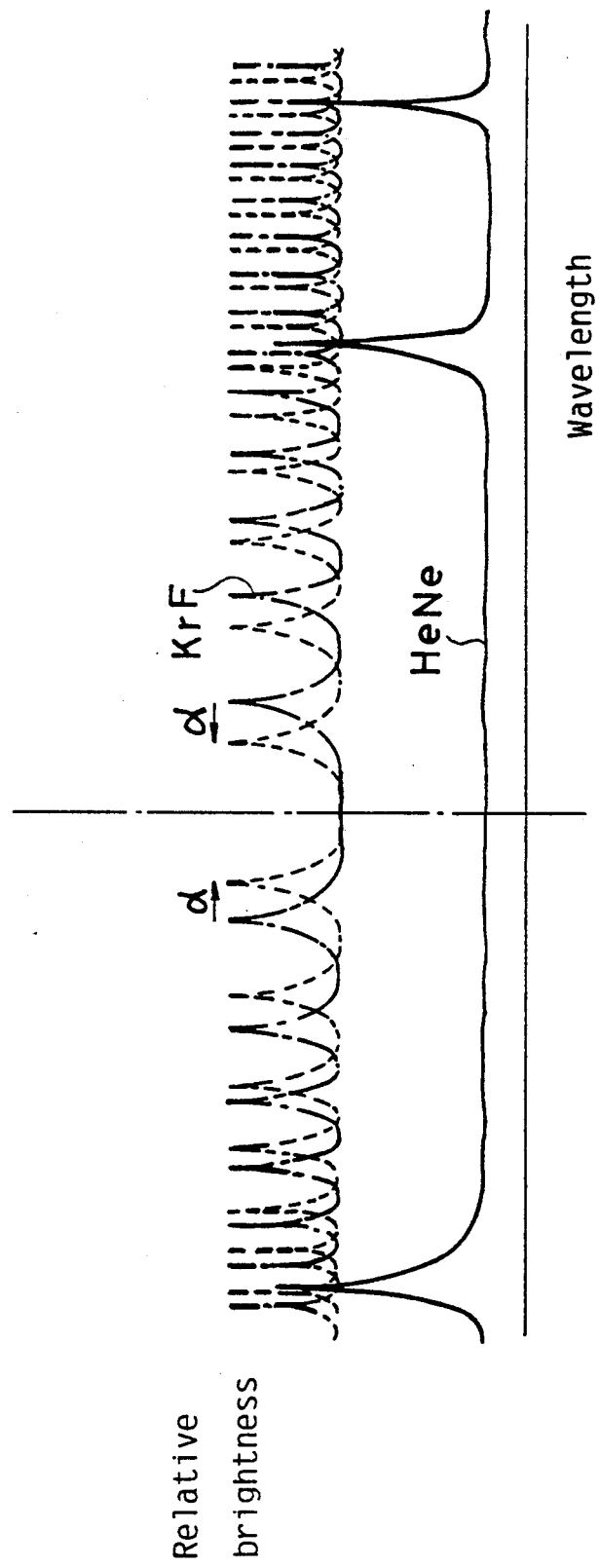
FIG. 15 is a graphic representation of light intensity distribution profiles derived from the interference fringes attributable to KrF laser and HeNe laser.

Moreover, in order to make the magnification of the spectrum width of the interference fringe images to the order of about 0.1 pm for one optical detector in the image sensor, it is necessary to make an initial adjustment of an angle of inclination of the FP etalon 201 with respect to the optical axis and of a refractive index of a substance contained in the gap (gas density). As shown in FIG. 15, the adjustment is made by known optical means in a manner that the interference fringes attributable to the reference light source can be projected on the image sensor 210 across full expansion of the latter.

Figure 14:
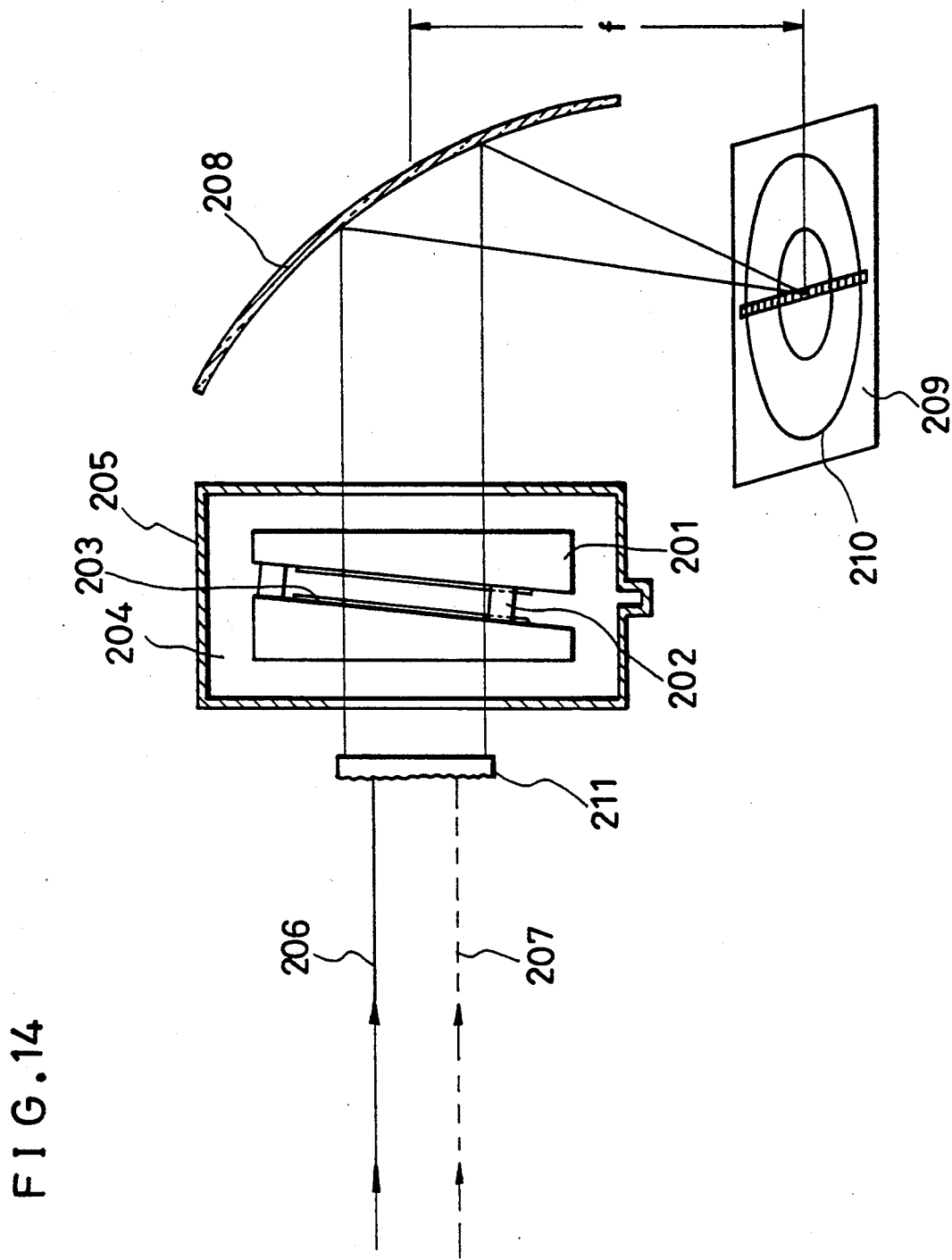

In a case where the wavelength of the reference light source differs from that of the narrowed bandwidth laser, a read-out error of the wavelength attributable to chromatic aberration is produced. In order to eliminate or decrease this error, this embodiment employs a reflective optical system as shown in FIG. 14. The greatest feature of the reflective optical system is that the system is free from the wavelength dependency in the focal length of a reflecting mirror and the like. Therefore, the focal length f becomes the focal length for the narrowed bandwidth laser without any additional appliance such as an achromatic lens 222 shown in FIG. 13.

In the above-description with reference to FIG. 13, although only the wavelength monitor which employs a non-spheric reflecting mirror 208 is shown, the disclosed method of using the beam 207 of the HeNe laser as the reference light source can likewise be applicable. And in this embodiment, too, a similar advantage is achievable to the case of focusing interference fringe images 209 on the image sensor 210 by employing an achromatic FT lens 212 (refraction optical system shown in FIG. 13) which is designed to have sufficiently small chromatic aberrations for both the wavelengths of the HeNe laser and the narrow bandwidth laser, whose wavelength should be stabilized.

EXAMPLE 8

Figure 16:
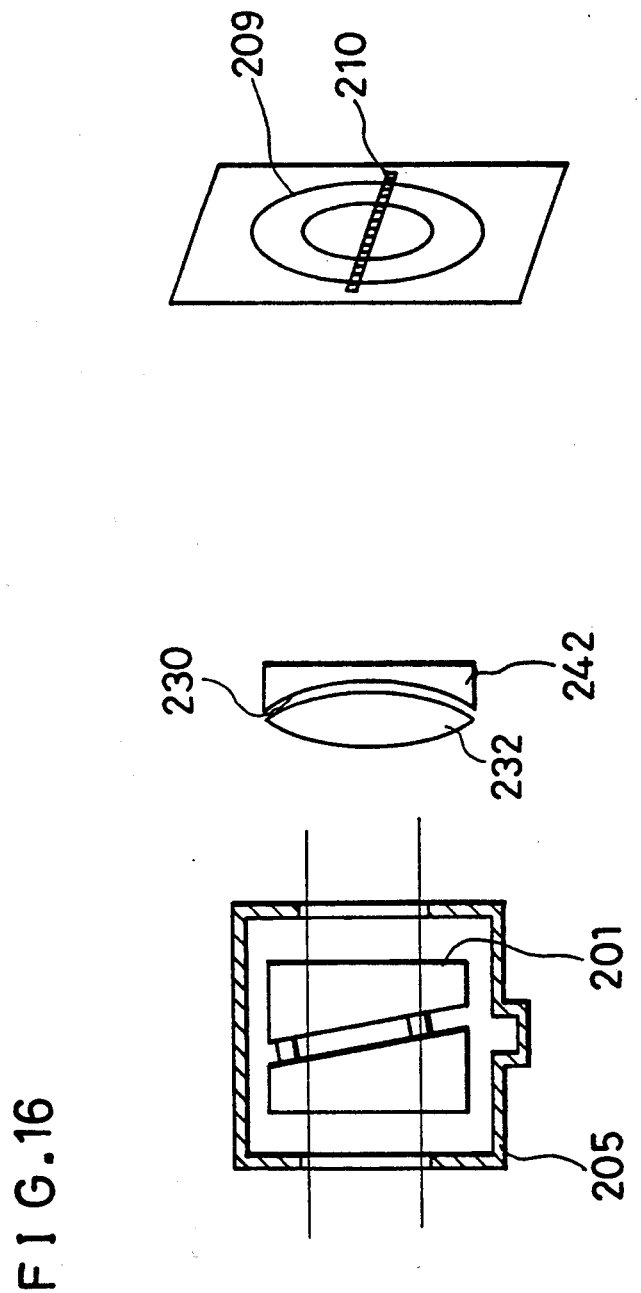
FIGS. 16, 17, 18, 19, 20 and 21, each is a schematic view of an alternative optical system for those shown in FIGS. 13 and 14.

In addition to this, the advantages similar to those of the achromatic FT lens 212 can be obtained even when introducing an optical medium with a rather high dependency on the wavelength of refractive index into the optical system, and combining a plurality of single lenses 232 and 242 designed to conform with the optical medium 230, as shown by the schematic view of FIG. 16.

EXAMPLE 9

Figure 17:
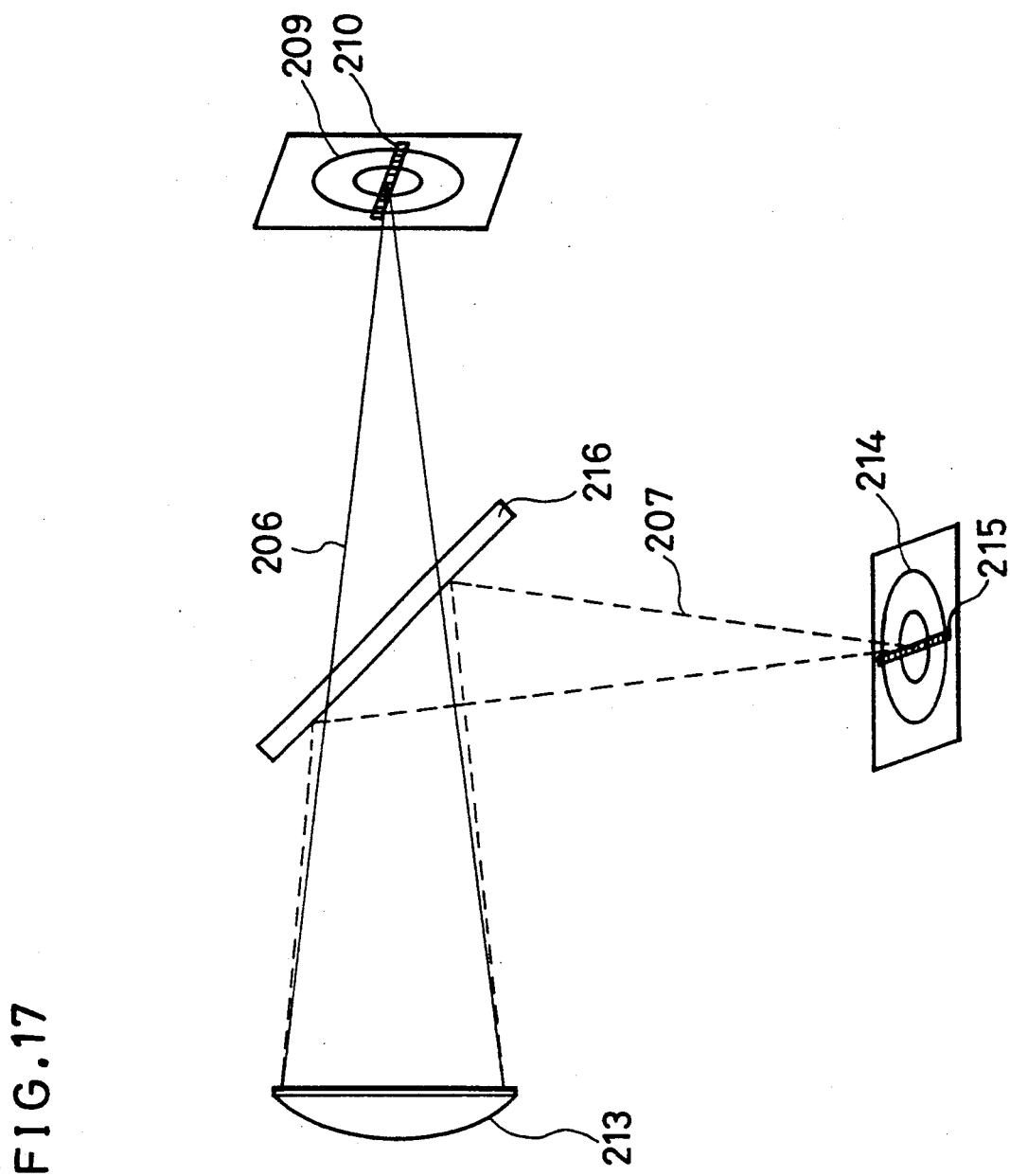

Apart from the above-mentioned uses of the achromatic FT lens 212 as means for magnifying and focusing both beams to project the interference fringe images, a modified configuration may be: as shown in FIG. 17, a single FT lens 213 is used, and respective image sensors 210 and 215 are provided at each of the focal planes for the narrow bandwidth excimer laser beam 206 and for the HeNe laser beam 207. And in this embodiment a beam splitter 216 is interposed between the lens 213 and the focal planes, because the focusing points of the beam 206 of the narrow bandwidth excimer laser and the reference beam 207 of the HeNe laser are different from each other. In FIG. 17, the beam splitter 216 is an antireflection (AR) component coated with a dichroic film. The beam splitter 216 transmits only the focusing beam 206 of the narrow bandwidth excimer laser so as to project the interference fringe images 209 on the image sensor 210, and reflects only the focusing beam 207 of the HeNe laser so as to project the interference fringe images 214 on a separate image sensor 215.

EXAMPLE 10

Figure 18:
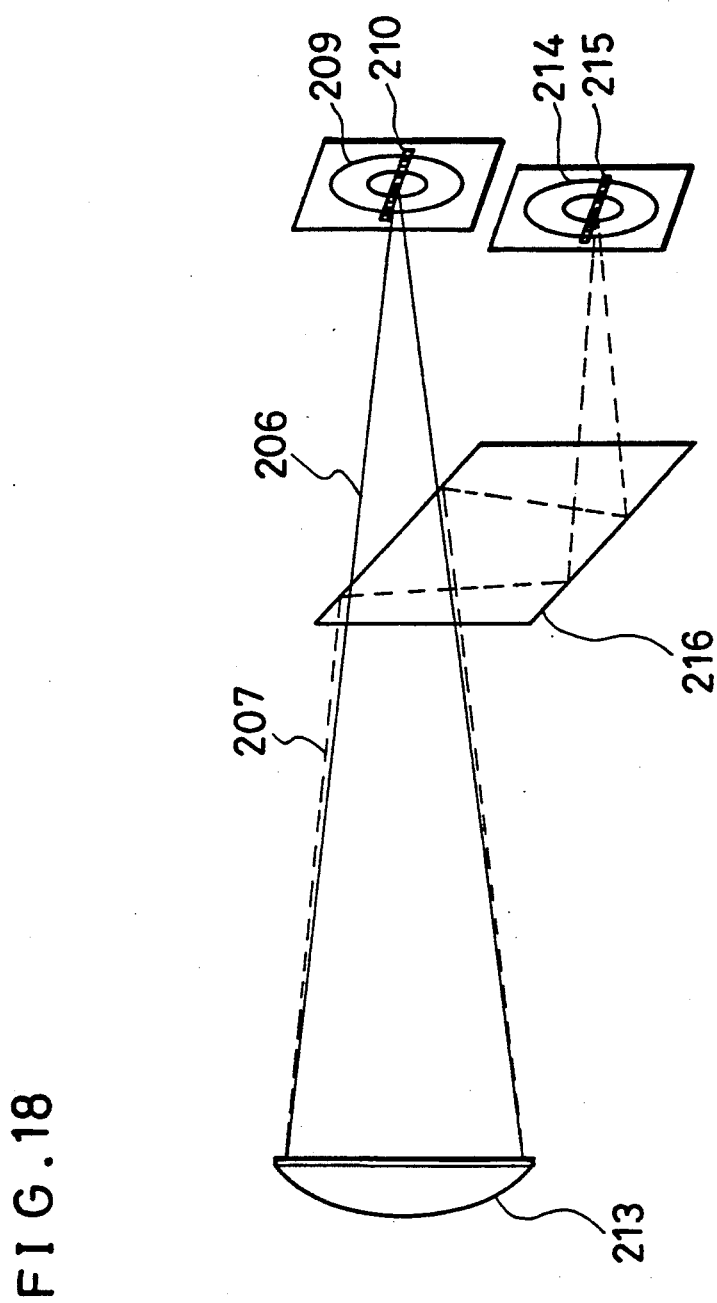

In the above-mentioned embodiment of FIG. 17, the beam 207 of the HeNe laser is splitted by the planer beam splitter 216 in the direction of substantially right angle with respect to the inherent optical axis of the system. But the same advantage can be obtained by employing a prism 217 as another beam splitter to split the beam in a direction other than the right angle. In the embodiment shown in FIG. 18, an integral-type beam splitter such as a rhomboid prism 217 is used, and an optical axis of the focusing beam 207 of the HeNe laser is arranged in substantial parallelism with the optical axis of the beam 206 of the narrow bandwidth laser. Further, by making both the image sensors integral, the stability of the magnifying and focusing optical systems for both of the interference fringe images is improved.

Moreover, apart from the above-mentioned embodiments wherein the beam 206 of the narrow bandwidth laser is exclusively transmitted and the beam 207 of the HeNe laser is splitted are elucidated, the transmitting beam may be replaced by the splitted beams by changing the coating film of the beam splitter 216.

EXAMPLE 11

Figure 19:
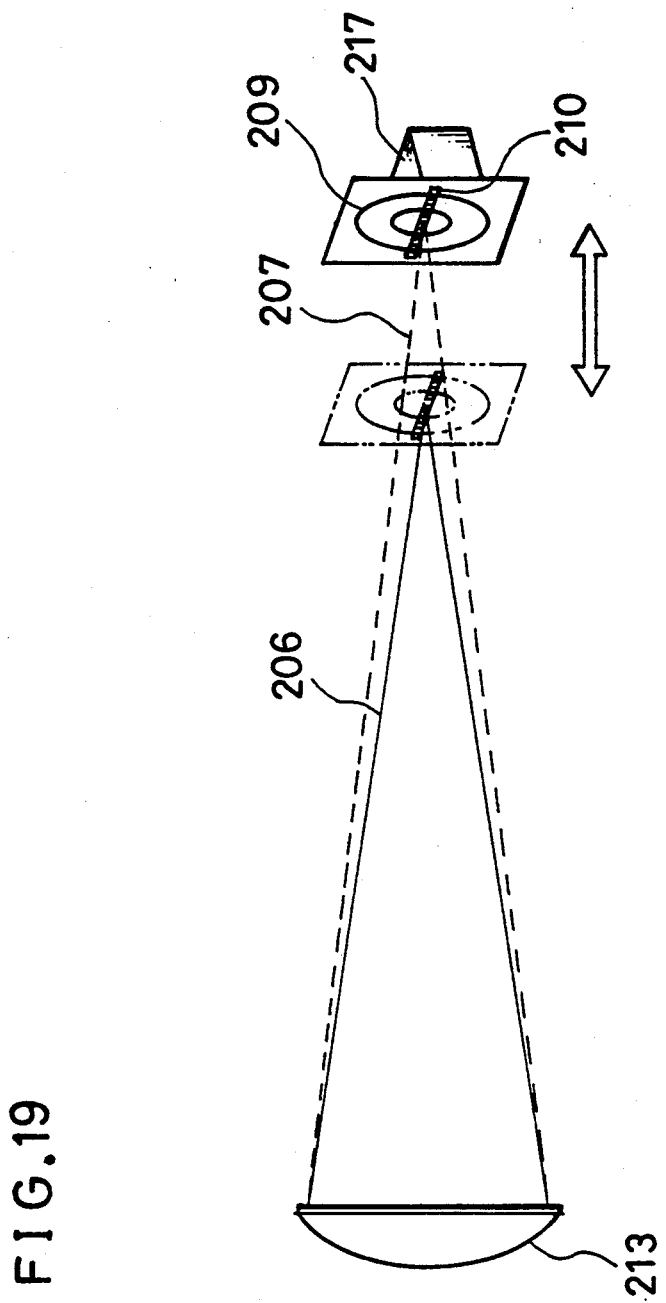

In another embodiment shown in FIG. 19, a single FT lens is employed as in the case of the foregoing embodiment. Instead of providing the beam splitter 216 and the additional image sensor 215, a means 217 for driving the image sensor 210 is provided. By actuating the driving means 217, hence, adjusting the position of the image sensor 209 along a direction of the shown white arrow, in a manner to coincide with the position to the respective focusing points of the beams of the narrow bandwidth laser and of the HeNe laser, the measurement can be made at a high level of accuracy.

EXAMPLE 12

Figure 20:
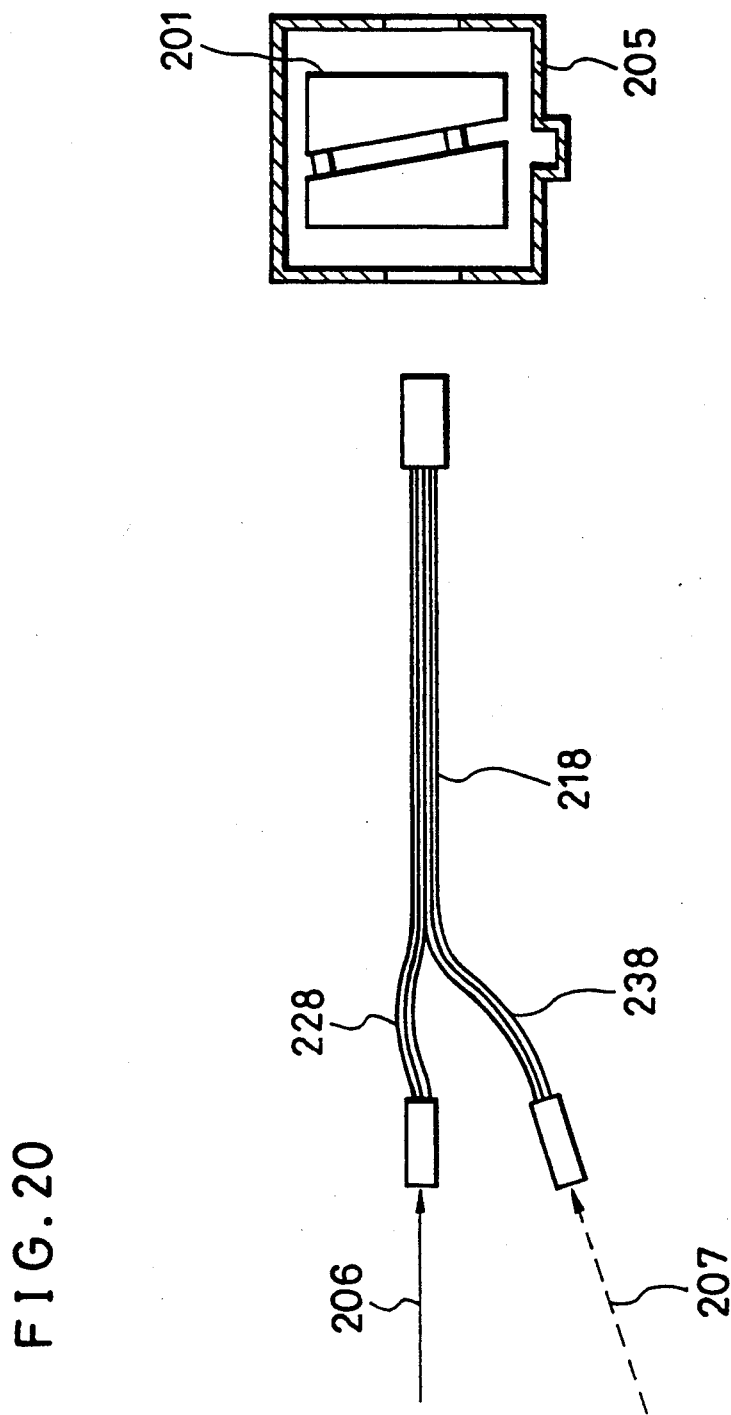

The optical system for introducing the beams into the FP 201 of the wavelength monitor of the present invention may be configured in an alternative manner. In FIG. 20, a bundle fiber 218 composed of a multiplicity of optical fibers 228 and 238 is used with a similar advantage, in place of the diffuser 211 shown in FIG. 14 which is used for causing each of the laser beams to have various angular constituents. An additional advantage of this embodiment is that the configuration can dispense with the diffuser. Another advantage is that, by using a bundle fiber 218 which is bifurcated into the pair of optical fibers 228 and 238 at the side of beam incidence, there is no need any more to align both the optical axes of the two laser beam 206 and 207.

In the configurations of the above-mentioned embodiments, an anticipated range of wavelength variance of the narrowed bandwidth laser beam 206 is set as $\pm \alpha$pm, for considering the limit of the definition of the images. Even a considerably stabilized narrowed band laser might have a wavelength variance as large as its spectral bandwidth (2 pm, in the foregoing embodiment) and thus the anticipated range should be $\pm 2$ pm or smaller. The wavelength of the interference fringe images corresponding to one element in the image sensor can be set to 0.02 pm or smaller, by suitably selecting the combination of the gap distance of the FP 201 with the focal length of the magnifying and focusing optical system. Accordingly, together with the spectral bandwidth of 0.004 pm of the HeNe laser, it is possible to measure the wavelength with an accuracy of approximating to $\pm 0.02$ pm.

EXAMPLE 13

Figure 21:
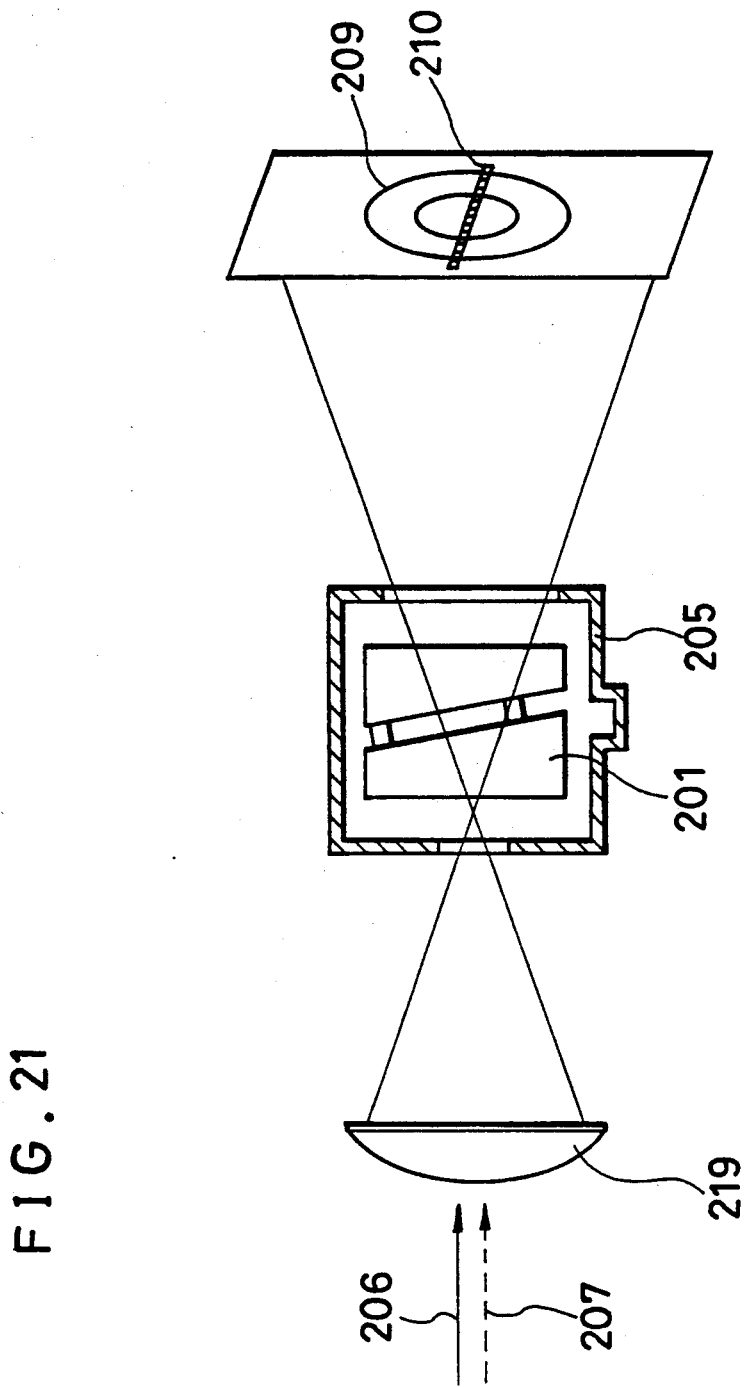
Figure 22:
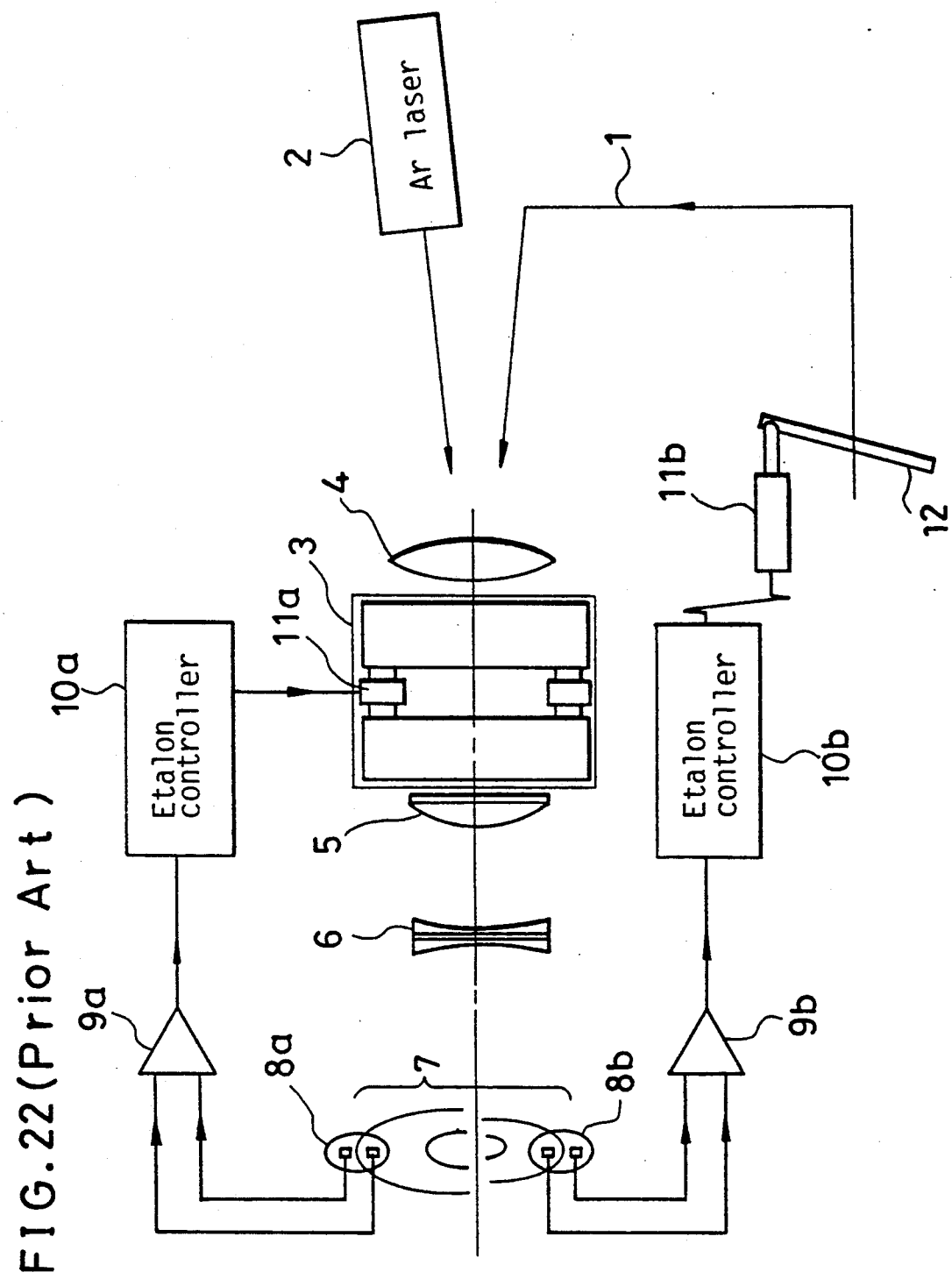
FIG. 22 is a schematic view showing an example of the conventional wavelength stabilizer for a narrow bandwidth laser.
Figure 23:
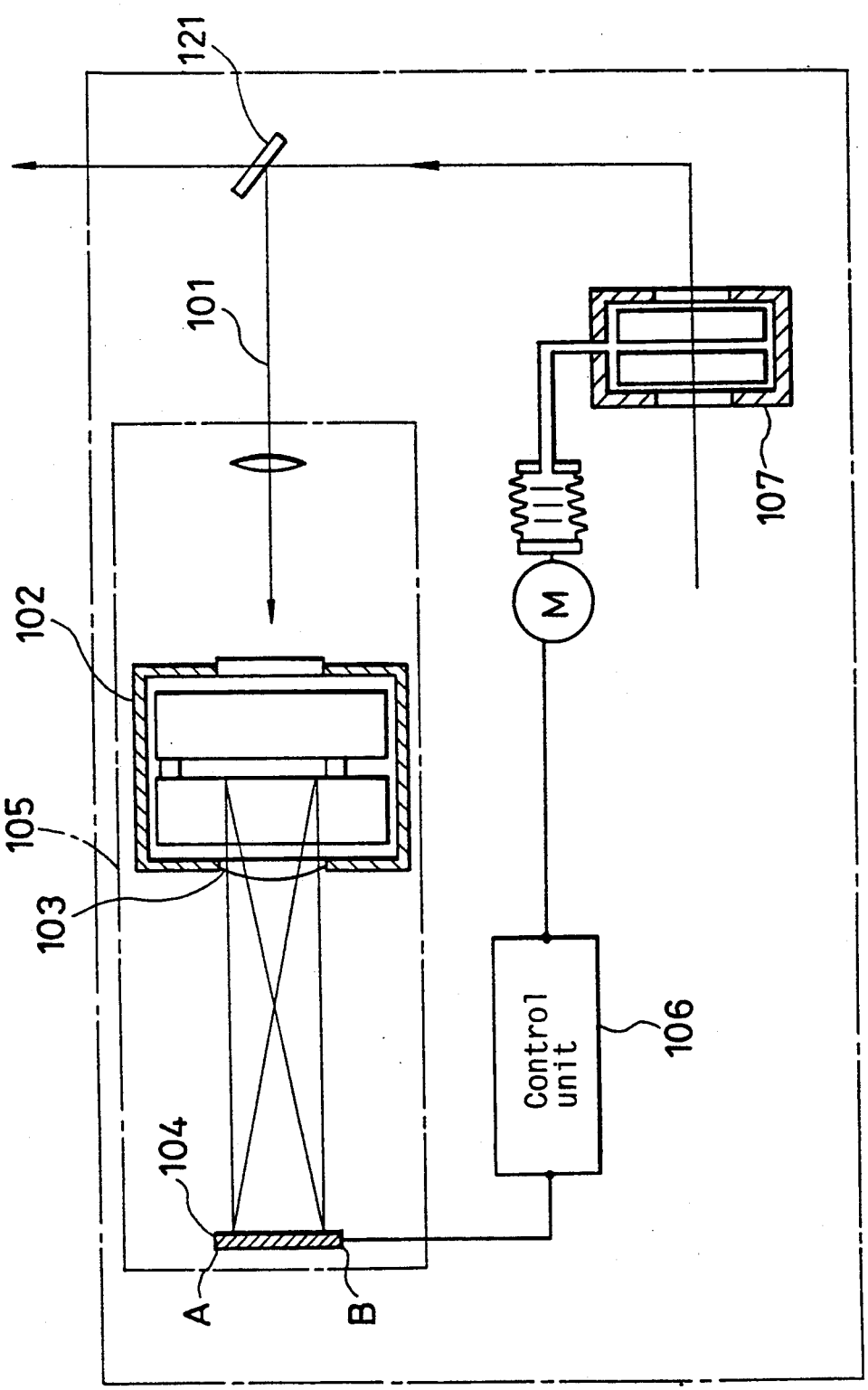
FIG. 23 is a schematic view showing another example of the conventional wavelength monitor for a narrow bandwidth laser.
Figure 24:
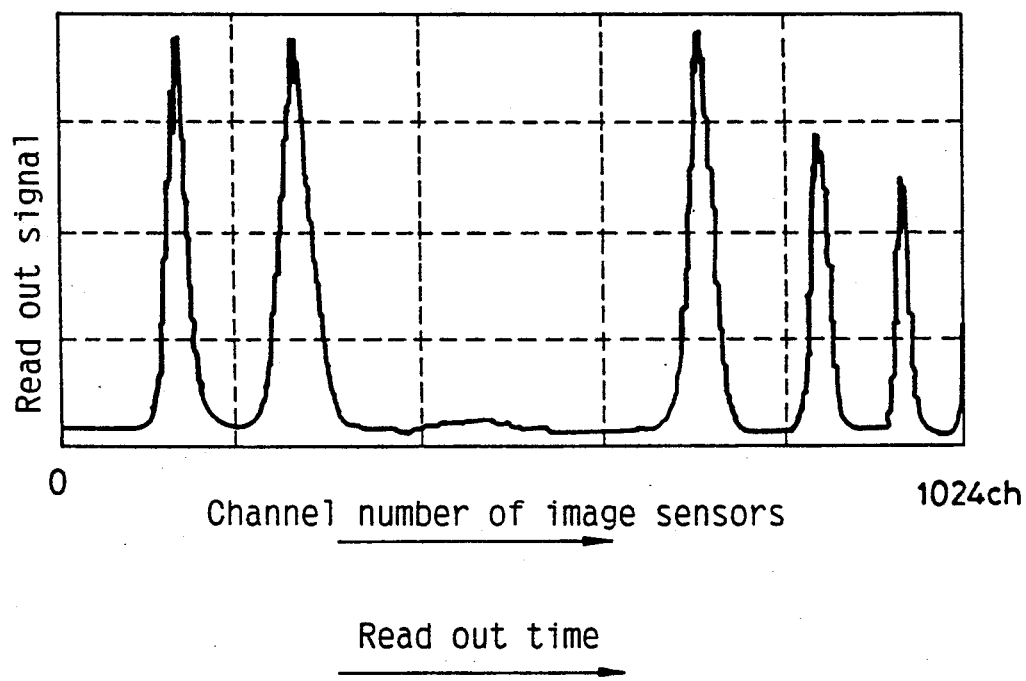
FIG. 24 is a graph showing a light intensity distribution profile representing an interference fringes, obtained by an image sensor in the conventional wavelength monitor shown in FIG. 23.
Figure 25:
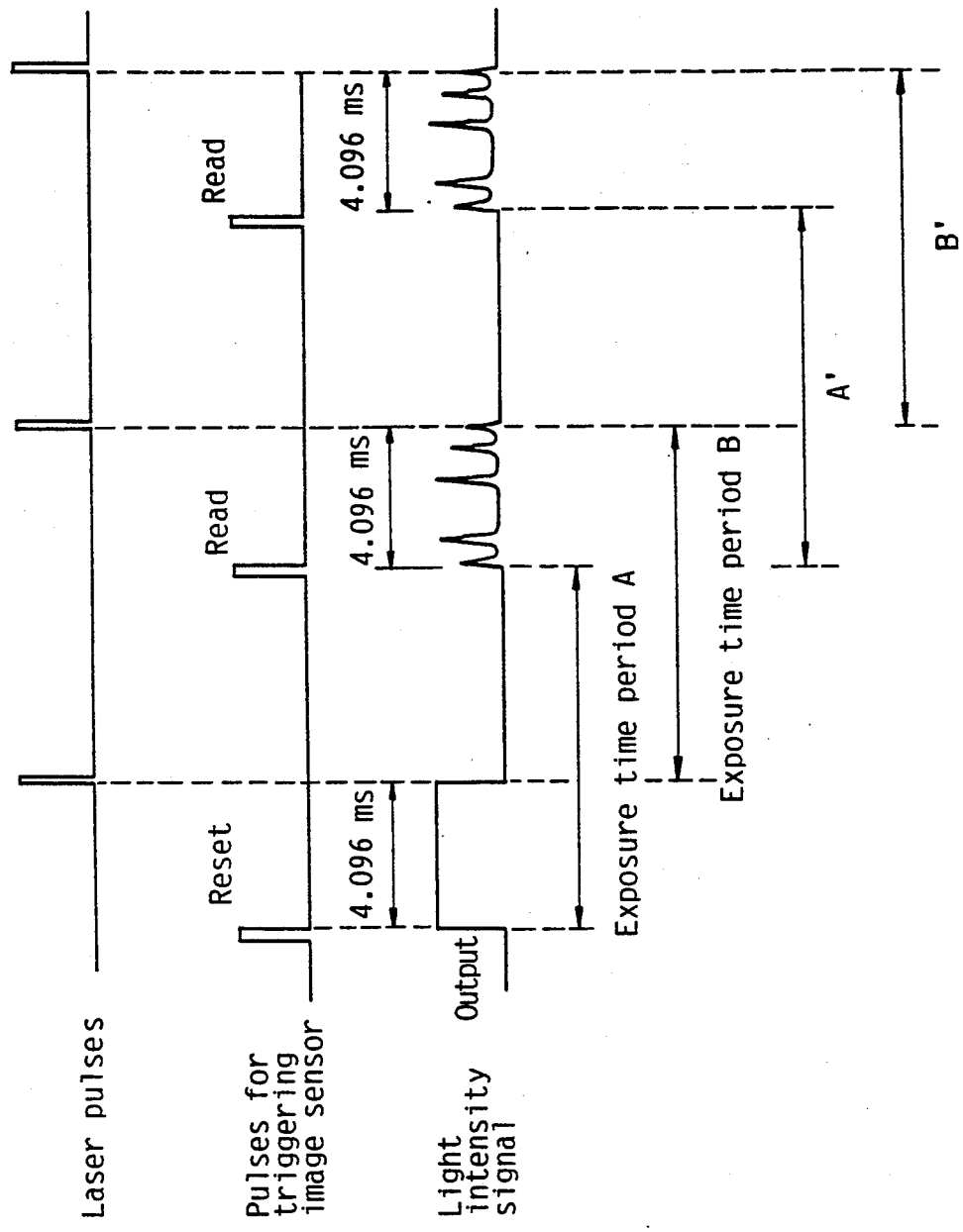
FIGS. 25 and 26, each is waveform diagrams indicating the temporal relationship among the laser pulses, trigger pulses and light intensity signal.
Figure 26:
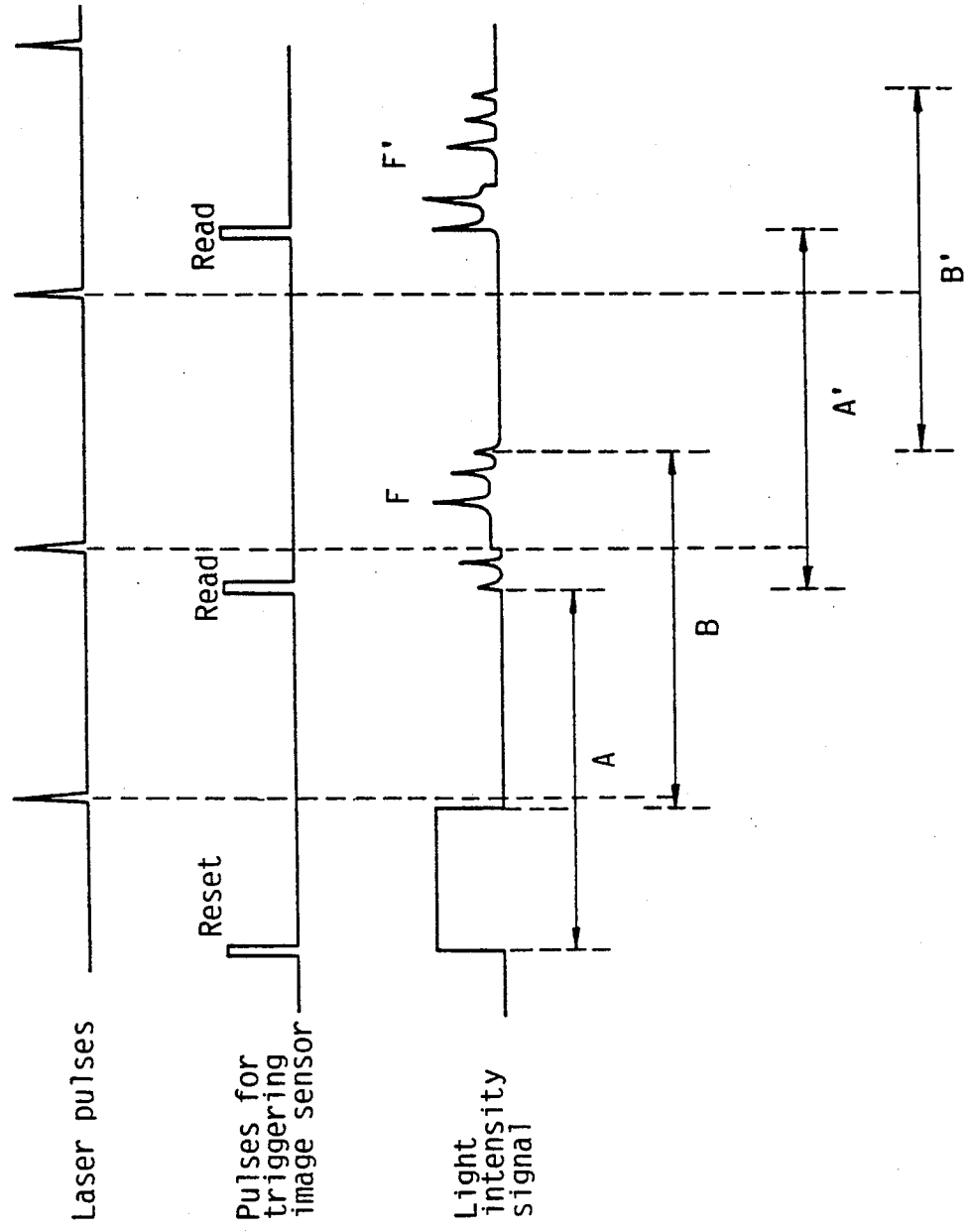
Figure 27:
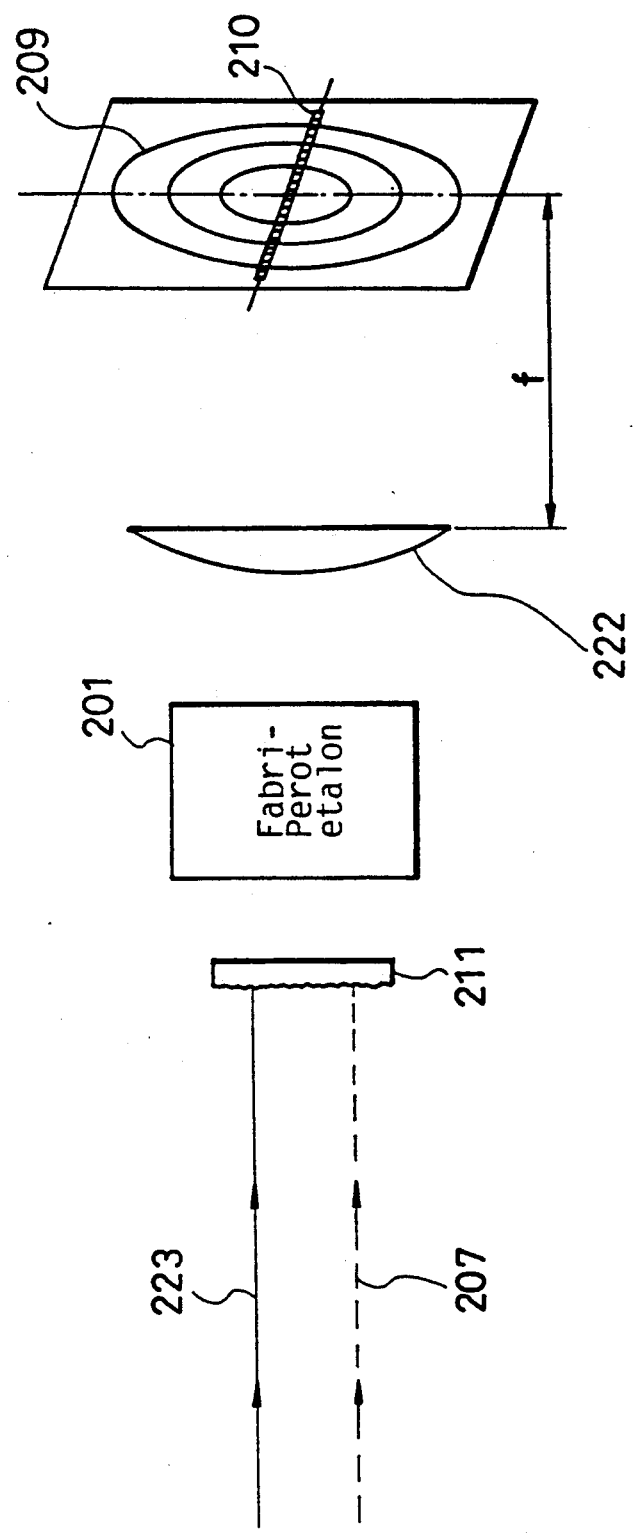
FIG. 27 is a schematic view showing a still another example of the conventional wavelength monitor for narrow bandwidth laser.

FIG. 21 is a schematic view showing still another embodiment, wherein the incoming beams of the lasers are converted into those having various angular constituents by a convex lens 219 and caused to be incident upon the FP 201, whereby the diffuser 211 and the FT lens 222 are omitted. This embodiment has an advantage in that it can simplify the incident optical system as well as the magnifying and focusing optical system. The convex lens may be substituted by a concave lens, a spherical mirror or the like component for expecting a similar advantage.

Further, although $N_2$ gas is filled in the gas-tight container in each of the foregoing embodiments, a stabilization in a degree similar to those attained in the foregoing embodiments can likewise be obtained by evacuating the gas-tight container instead of simple sealing, by providing a pressure sensor on the container, connecting an exhausting pipeline to the container and controlling the gas-tight conditions with a high degree of accuracy. This is because the pressure sensor will become one having an accuracy of about two digits higher than the usual pressure sensor in general, if it is used in the vicinity of vacuum.

Moreover, although $N_2$ gas is used as the optical medium sealed in the gap of the FP etalon in each of the foregoing embodiments, any other gas may likewise be used, and He gas which shows a small change in the refractive index with the pressure change is preferable for this purpose.

Further, in the above-mentioned embodiments, the KrF excimer laser and the wavelength-stabilized HeNe laser are exclusively used as the narrow bandwidth laser and the reference light source, respectively. Any other lasers capable of changing their wavelength by inserting a wavelength selecting device into the resonator may naturally be used as the narrow bandwidth laser. It is needless to say that as the reference light source, a single mode Ar, Kr or HeCd laser may be used, and that a discharge tube containing a single isotope mercury lamp having a sufficiently small spectrum bandwidth may preferably be used.

Although the present invention has been described in its preferred form with a certain degree of particularity, it is understood that the present disclosure of the preferred forms has been changed in the details of construction and the combination and arrangement of parts and components may be resorted to without going out from the sprit and the scope of the invention as hereinafter claimed.

What is claimed is:

1. In a wavelength stabilizer for a narrow bandwidth laser, wherein an object oscillating wavelength of an object laser beam whose wavelength is to be stabilized is measured by utilizing interference fringes given by passing the beam through an etalon and said object oscillating wavelength of said narrow bandwidth laser is controlled based on the results of said wavelength measurement, including a calibration of said oscillating wavelength by utilizing a reference light source, measuring the reference diameters of the interference fringes given by the beam of said reference light source, and measuring the object diameters of said interference fringes given by said object laser beam, the improvement comprising:
an arithmetic unit for processing measurement-based parameters derived from the measurements of said reference diameters and said object diameters and processing target-based parameters corresponding to the desired object oscillating wavelength of the object laser, and
a control unit for controlling said object oscillating wavelength in a manner that said measurement-based parameters and said target-based parameters coincide each other.

2. The wavelength stabilizer for a narrow bandwidth laser in accordance with claim 1, wherein said reference light source has a wavelength in a range which satisfies a number of significant digit in the refractive index corresponding to the desired accuracy of the wavelength of the object laser whose wavelength should be stabilized.

3. The wavelength stabilizer for a narrow bandwidth laser in accordance with either of claims 1 or 2, which further comprises: a container for gas-tightly confining said etalon, a thermostatic container for accommodating said container in a thermostatic condition, and an optical filter for absorbing visible light components from light incident to said container.

4. In a wavelength monitor for a narrow bandwidth object laser, which detects a wavelength of the narrow bandwidth object laser by a spectroscopic device and an image sensing unit and outputs a signal for controlling the wavelength of said narrow bandwidth object laser based on the results of the detection, a wavelength monitor for narrow bandwidth object laser, the improvement that:
said image sensing unit comprises plural image sensors and further comprising,
a device for adjusting the distance between said plural image sensors.

5. In a wavelength monitor for a narrow bandwidth object laser, which detects a wavelength of the narrow bandwidth object laser by a spectroscopic element and an image sensing unit, and outputs a signal for controlling the wavelength of said narrow bandwidth object laser based on results of the detection, a wavelength monitor for narrow bandwidth object laser, the improvement comprising: a multiplexer comprising a switching means for selecting particular channels from an array of channels of optical detectors included in said image sensing unit and for reading detected light intensity signals carried on the selected channels.

6. In a wavelength monitor for a narrow bandwidth object pulse laser, which detects a wavelength of the narrow bandwidth object pulse laser by a spectroscopic element and an image sensing unit, and outputs a signal for controlling the wavelength of said narrow bandwidth object pulse laser based on results of the detection, a wavelength monitor for narrow bandwidth object pulse laser, the improvement that:
an interval for reading the light intensity signal carried on the optical detectors included in said image sensing unit is selected to be integer times the repetitive interval of oscillation of said object pulse laser.

7. In a wavelength monitor for stabilizing a center wavelength of a narrow bandwidth object laser, a wavelength monitor for the narrow bandwidth object laser comprising means for observing the wavelength, the improvement that:
said means for observing the wavelength is an etalon of a Fabry-Perot type, comprising spacers having a coefficient of linear expansion of $5 \times 10^{-5}$ or smaller and comprising,
a gas-tight container containing said Fabry-Perot type etalon therein.

8. The wavelength monitor in accordance with claim 7, wherein
a separate reference laser is provided as the light source for reference wavelength radiation,
said etalon is provided with films having a reflectance which is sufficiently high for both of the wavelengths of said narrow bandwidth object laser and of said reference laser, and further comprising,
means for guiding said two laser beams, and
means for focusing said guided two laser beams.

* * * * *